US012640876B2

(12) United States Patent　　(10) Patent No.: US 12,640,876 B2
Yu et al.　　(45) Date of Patent: May 26, 2026

(54) CHANNEL SOUNDING METHOD AND APPARATUS

(71) Applicant: HUAWEI TECHNOLOGIES CO., LTD., Shenzhen (CN)

(72) Inventors: Jian Yu, Shenzhen (CN); Yuchen Guo, Shenzhen (CN); Xun Yang, Shenzhen (CN); Dandan Liang, Shenzhen (CN); Yunbo Li, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1000 days.

(21) Appl. No.: 17/848,388

(22) Filed: Jun. 24, 2022

(65) Prior Publication Data

US 2022/0321301 A1　　Oct. 6, 2022

Related U.S. Application Data

(63) Continuation of application No. PCT/CN2020/135153, filed on Dec. 10, 2020.

(30) Foreign Application Priority Data

Dec. 24, 2019　(CN) .......................... 201911350247.5

(51) Int. Cl.
*H04L 5/00* (2006.01)
*H04B 7/06* (2006.01)
(Continued)

(52) U.S. Cl.
CPC ......... *H04L 5/0051* (2013.01); *H04B 7/0626* (2013.01); *H04L 25/0224* (2013.01); *H04W 48/08* (2013.01); *H04W 48/16* (2013.01)

(58) Field of Classification Search
None
See application file for complete search history.

(56) References Cited

U.S. PATENT DOCUMENTS

2011/0261708 A1* 10/2011 Grandhi .................. H04W 4/06
370/252
2015/0156794 A1* 6/2015 Kwon ................. H04L 25/0224
370/329
(Continued)

FOREIGN PATENT DOCUMENTS

CN 　　1801753 A 　7/2006
CN 　106465202 A 　2/2017

OTHER PUBLICATIONS

Broadcom Corporation, LAA Coexistence with Wi-Fi Evaluation Issues, 3GPP TSG RAN WG1 Meeting Ad Hoc , R1-151088 , Paris, France, Mar. 24-26, 2015,6 pages.
(Continued)

*Primary Examiner* — Andre Tacdiran

(57) ABSTRACT

A channel sounding method and an apparatus are provided. The method includes a first access point device sending a sounding request frame to a second access point device, the sounding request frame requesting the second access point device perform channel sounding, the sounding request frame includes one or both of a sounding bandwidth field or a number of spatial streams field, the sounding bandwidth field indicating a bandwidth for performing the channel sounding, the number of spatial streams field indicating a quantity of spatial streams on which the channel sounding is performed.

16 Claims, 17 Drawing Sheets

(51) Int. Cl.
  *H04L 25/02*    (2006.01)
  *H04W 48/08*    (2009.01)
  *H04W 48/16*    (2009.01)

(56) References Cited

U.S. PATENT DOCUMENTS

| | | | | |
|---|---|---|---|---|
| 2016/0254884 A1* | 9/2016 | Hedayat | ............... | H04B 7/0628 |
| | | | | 370/329 |
| 2016/0255656 A1* | 9/2016 | Lou | ....................... | H04L 1/1887 |
| | | | | 370/335 |
| 2017/0170937 A1* | 6/2017 | Chun | .................... | H04L 5/0094 |
| 2018/0092127 A1* | 3/2018 | Park | ................. | H04W 72/0453 |
| 2018/0263044 A1 | 9/2018 | Zhou et al. | | |
| 2021/0143887 A1* | 5/2021 | Oteri | ................... | H04B 7/0617 |

OTHER PUBLICATIONS

Junghoon Suh et al,Sounding for AP Collaboration, IEEE 802.11-19/1535r0, Sep. 16, 2019, 11 pages.
"IEEE P802.11ax/D1.3, Jun. 2017, Draft Standard for Information technology Telecommunications and information exchange between systems Local and metropolitan area networks Specific requirements Part 11: Wireless LAN Medium Access Control (MAC) and Physical Layer (PHY) Specifications Amendment 6: Enhancements for High Efficiency WLAN, 522 pages".

* cited by examiner

AP1 | Sounding request trigger frame

AP2 | Sounding response frame

AP3 | Sounding response frame

FIG. 7C

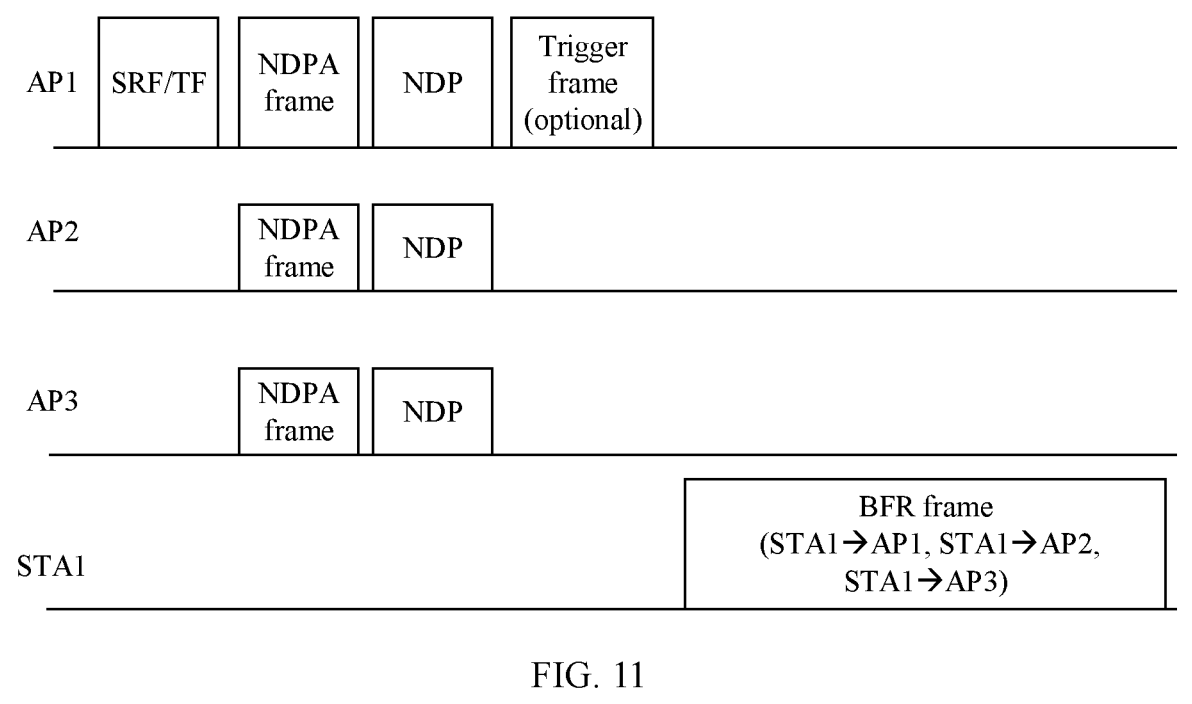

AP1 | SRF/TF | NDPA frame | NDP | Trigger frame (optional)

AP2 | NDPA frame | NDP

AP3 | NDPA frame | NDP

STA1 | BFR frame (STA1→AP1, STA1→AP2, STA1→AP3)

FIG. 11

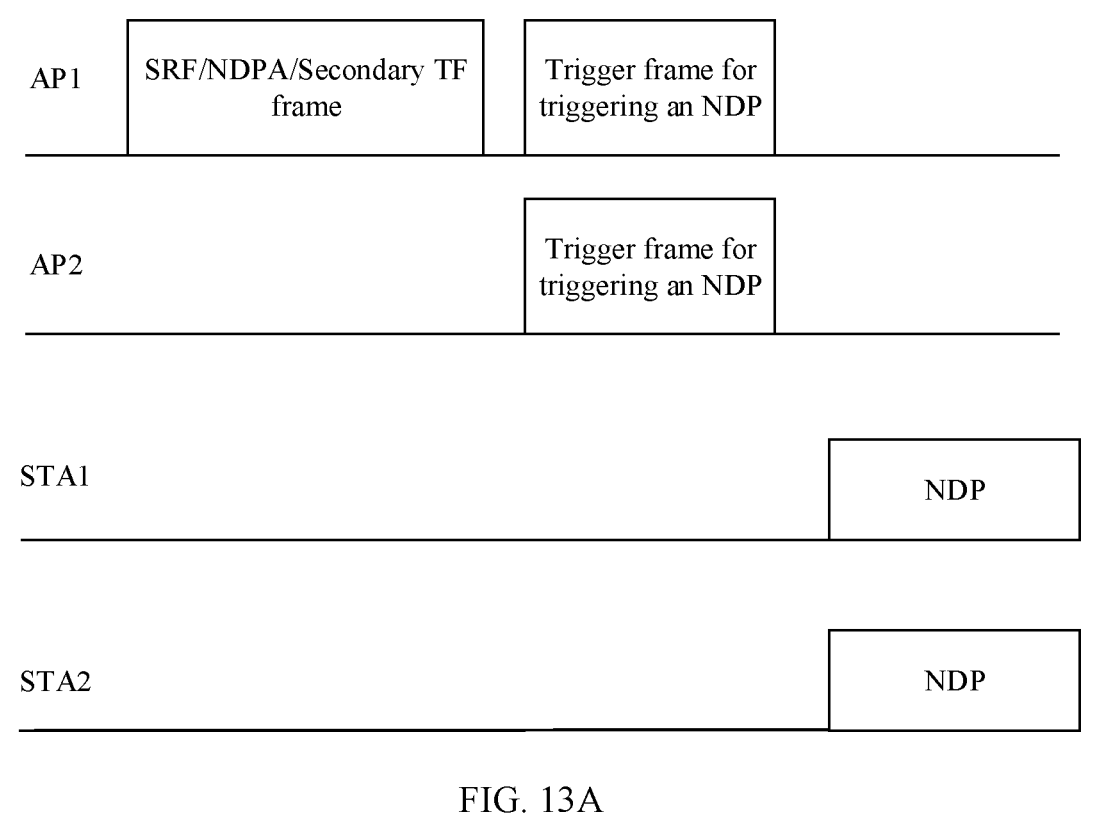

| AP1 | SRF/NDPA/Secondary TF frame | Trigger frame for triggering an NDP | |

| AP2 | | Trigger frame for triggering an NDP | |

| STA1 | | | NDP |

| STA2 | | | NDP |

FIG. 13A

Trigger frame type: trigger frame for triggering
an NDP (Trigger for NDP)

CHANNEL SOUNDING METHOD AND APPARATUS

CROSS-REFERENCE TO RELATED APPLICATIONS

This application is a continuation of International Application No. PCT/CN2020/135153, filed on Dec. 10, 2020, which claims priority to Chinese Patent Application No. 201911350247.5, filed on Dec. 24, 2019. The disclosures of the aforementioned applications are hereby incorporated by reference in their entireties.

TECHNICAL FIELD

This application relates to the field of communication technologies, and in particular, to a channel sounding method and an apparatus.

BACKGROUND

With development of wireless networks and continuous popularization of wireless local area network (WLAN) technologies, WLAN devices are deployed more densely. Because wireless access points (AP) are easy to deploy, the APs are more frequently used.

In addition, a future WLAN standard (for example, 802.11be) expects to increase a throughput by increasing spatial streams (for example, 16 streams). However, due to limited device capabilities, it is usually difficult for a single access point to provide 16 spatial streams, and therefore, coordinated multi-AP transmission featuring D-MIMO (Distributed Multiple Input Multiple Output), which is also referred to as joint transmission, becomes a technical means for implementing a large quantity of spatial streams.

Channel sounding is usually performed before transmission. FIG. 1 is a signal diagram of a channel sounding method according to an embodiment. In a non-coordinated scenario, FIG. 1 shows a channel sounding procedure performed by a single AP. The AP first sends a null data packet announcement (NDPA) frame to notify a station (STA) that needs to perform channel sounding, and a related channel sounding parameter; and then, sends a null data packet (NDP) (excluding the data field part) after a short interframe space (SIFS) elapses. The STA may perform channel estimation based on the received NDP, and feed back channel state information (CSI) by using a beamforming report (BFR) frame.

However, in an AP coordination scenario, how a plurality of APs perform channel sounding, to implement coordinated multi-AP transmission is still a problem to be urgently resolved.

SUMMARY

This application provides a channel sounding method and an apparatus, to improve efficiency of coordinated transmission.

According to a first aspect, this application provides a channel sounding method. The method includes the following steps:

A first access point (AP) device sends a sounding request frame to a second access point device. The sounding request frame is for requesting the second access point device to perform channel sounding, the sounding request frame comprises a sounding bandwidth field and/or a number of spatial streams field, the sounding bandwidth field is used to indicate a bandwidth for performing channel sounding, and the number of spatial streams field is used to indicate a quantity of spatial streams on which channel sounding is performed.

The first access point device may be understood as a primary access point device, and the second access point device may be understood as a secondary access point device. It may be understood that, in some embodiments of this application, one second access point device may be included. In some other embodiments of this application, a plurality of second access point devices may be included.

In this embodiment of this application, the second access point device determines, based on the sounding request frame, a sounding bandwidth for performing channel sounding and a quantity of spatial streams on which channel sounding is performed. In this way, the first access point device and the second access point device perform coordinated transmission on a same bandwidth and under scheduling (for example, spatial stream allocation) of the first access point device. This improves efficiency of coordinated transmission between the first access point device and the second access point device.

In an embodiment, the sounding request frame further includes an access point identifier field, and the access point identifier field is used to indicate identification information of the second access point device.

In this embodiment of this application, the access point identifier field may further include a sounding dialog token used when the first access point device performs channel sounding. In this case, the second access point device learns of the correspondence between ongoing channel sounding and a channel sounding process performed by the first access point device.

In an embodiment, the sounding request frame further includes a station information field, and the station information field is used to indicate identification information of a station device. The identification information of the station device includes an association identifier of the station device; or the identification information of the station device includes an association identifier of the station device and identification information of an access point device associated with the station device.

In an embodiment, the sounding request frame further includes one or more of a number of grouping, a codebook size, and a feedback type.

In an embodiment, before the first access point device sends the sounding request frame to the second access point device, the method further includes: The first access point device sends a null data packet announcement NDPA frame to the station device; the first access point device sends a null data packet NDP to the station device; and the first access point device receives a beamforming report frame sent by the station device, where the beamforming report frame is used to report channel state information between the first access point device and the station device.

In an embodiment, the method further includes: The first access point device sends a trigger frame to the second access point device, where the trigger frame is used to trigger the second access point device to feed back a sounding response frame; and the first access point device receives the sounding response frame sent by the second access point device.

Alternatively, that a first access point device sends a sounding request frame to a second access point device includes: The first access point device sends an aggregate medium access control (MAC) protocol data unit (MPDU) frame to the second access point device, where the aggregate frame includes the sounding request frame and a trigger frame, and the trigger frame is used to trigger the second access point device to feed back the sounding response frame; and the first access point device receives the sounding response frame sent by the second access point device.

Alternatively, the sounding request frame further includes scheduling information used by the second access point device to transmit the sounding response frame; and the first access point device receives the sounding response frame sent by the second access point device.

In this embodiment of this application, the sounding request frame and the trigger frame are aggregated to one aggregate medium access control (MAC) protocol data unit (MPDU) A-MPDU frame, or one sounding request frame is used to simultaneously request the second access point device to perform channel sounding and trigger the second access point device to feed back the sounding response frame. In this way, the second access point device can feed back the sounding response frame in a timely manner, and reduce overheads of a physical layer preamble.

In an embodiment, the first access point device sends a query frame. The query frame includes a sounding dialog token, and the query frame is used to inquire whether a sounding request frame corresponding to the sounding dialog token is received.

According to a second aspect, this application provides a channel sounding method. The method includes the following steps:

A second access point device receives a sounding request frame sent by a first access point device. The sounding request frame is for requesting the second access point device to perform channel sounding, the sounding request frame includes a sounding bandwidth field and/or a number of spatial streams field, the sounding bandwidth field is used to indicate a bandwidth for performing channel sounding, and the number of spatial streams field is used to indicate a quantity of spatial streams on which channel sounding is performed. The second access point device performs channel sounding based on the sounding request frame, to obtain channel state information between the second access point device and a station device.

In an embodiment, that the second access point device performs channel sounding based on the sounding request frame, to obtain channel state information between the second access point device and a station device includes: The second access point device sends a null data packet NDP to the station device, where a bandwidth field of the NDP is determined based on a sounding bandwidth field in the sounding request frame, and a number of spatial streams field of the NDP is determined based on a number of spatial streams field in the sounding request frame; and the second access point device receives a beamforming report frame sent by the station device, where the beamforming report frame is used to report channel state information between the second access point device and the station device.

In an embodiment, the sounding request frame further includes an access point identifier field, and the access point identifier field is used to indicate identification information of the second access point device.

In an embodiment, the sounding request frame further includes a station information field, and the station information field is used to indicate identification information of the station device. The identification information of the station device includes an association identifier of the station device; or the identification information of the station device includes an association identifier of the station device and identification information of an access point device associated with the station device.

In an embodiment, the method further includes: The second access point device receives a trigger frame sent by the first access point device, where the trigger frame is used to trigger the second access point device to feed back a sounding response frame; and the second access point device sends the sounding response frame to the first access point device.

Alternatively, that a second access point device receives a sounding request frame sent by a first access point device includes: The second access point device receives an aggregate medium access control MAC protocol data unit MPDU frame sent by the first access point device, where the aggregate frame includes the sounding request frame and the trigger frame, and the trigger frame is used to trigger the second access point device to feed back the sounding response frame; and the second access point device sends the sounding response frame to the first access point device.

Alternatively, the sounding request frame further includes scheduling information used by the second access point device to transmit the sounding response frame; and the second access point device sends the sounding response frame to the first access point device based on the scheduling information.

The channel sounding method provided in this embodiment of this application may also be understood as a method for performing channel sounding by a single AP through time division. In addition, the first access point device and the second access point device have a channel sounding capability, and perform channel sounding in a time division manner. This avoids simultaneous channel sounding of the first access point device and the second access point device, and reduces implementation complexity and hardware costs of the access point device. An example of channel sounding in a time division manner is as follows: After the first access point device completes a channel sounding procedure to obtain the CSI between the first access point device and the station device, the first access point device indicates the second access point device to perform the channel sounding procedure based on the sounding request frame.

According to a third aspect, this application provides a first access point device. The first access point device includes units configured to implement the method according to the first aspect and the embodiments of the first aspect.

According to a fourth aspect, this application provides a second access point device. The second access point device includes units configured to implement the method according to the second aspect and the embodiments of the second aspect.

According to a fifth aspect, this application provides a first access point device. The first access point device includes a processor and a memory. The memory is configured to store computer-executable instructions. The processor is configured to execute the computer-executable instructions stored in the memory, so that the first access point device performs the method according to the first aspect and the embodiments of the first aspect.

In an embodiment, the first access point device further includes a transceiver. The transceiver is configured to receive and/or send a signal. Optionally, the transceiver may be configured to perform the method related to the signal receiving and/or sending according to the first aspect and the embodiments of the first aspect.

According to a sixth aspect, this application provides a second access point device. The second access point device includes a processor and a memory. The memory is configured to store computer-executable instructions. The processor is configured to execute the computer-executable instructions stored in the memory, so that the second access point device performs the method according to the second aspect and the embodiments of the second aspect.

In an embodiment, the second access point device further includes a transceiver. The transceiver is configured to receive and/or send a signal. Optionally, the transceiver may be configured to perform the method related to the signal receiving and/or sending according to the second aspect and the embodiments of the second aspect.

According to a seventh aspect, this application provides a first access point device. The first access point device includes a processor and an interface circuit. The interface circuit is configured to receive code instructions and transmit the code instructions to the processor. The processor executes the code instructions, to perform the method according to the first aspect and the embodiments of the first aspect.

According to an eighth aspect, this application provides a second access point device. The second access point device includes a processor and an interface circuit. The interface circuit is configured to receive code instructions and transmit the code instructions to the processor. The processor executes the code instructions, to perform the method according to the second aspect and the embodiments of the second aspect.

According to a ninth aspect, this application provides a communication system. The communication system includes a first access point device and a second access point device. The first access point device is configured to perform the method according to the first aspect and the embodiments of the first aspect. The second access point device is configured to perform the method according to the second aspect and the embodiments of the second aspect.

According to a tenth aspect, this application provides a computer-readable storage medium, configured to store a computer program used to perform the method according to the first aspect and the embodiments of the first aspect.

According to an eleventh aspect, this application provides a computer-readable storage medium, configured to store a computer program used to perform the method according to the second aspect and the embodiments of the second aspect.

According to a twelfth aspect, this embodiment of this application provides a computer program product. The computer program product includes instructions. When the instructions are executed, the method according to the first aspect and the embodiments of the first aspect is implemented.

According to a thirteenth aspect, this embodiment of this application provides a computer program product. The computer program product includes instructions. When the instructions are executed, the method according to the first aspect and the embodiments of the first aspect is implemented.

According to a fourteenth aspect, this embodiment of this application provides a computer program, configured to perform the method according to the first aspect and the embodiments of the first aspect.

According to a fifteenth aspect, this embodiment of this application provides a computer program, configured to perform the method according to the second aspect and the embodiments of the second aspect.

BRIEF DESCRIPTION OF DRAWINGS

FIG. 7C is a signal diagram of a method for performing interaction between a plurality of APs according to an embodiment of this application;

FIG. 11 is a signal diagram of a channel sounding method according to an embodiment of this application;

FIG. 13A is a signal diagram of a channel sounding method according to an embodiment of this application;

DESCRIPTION OF EMBODIMENTS

Figure 1:
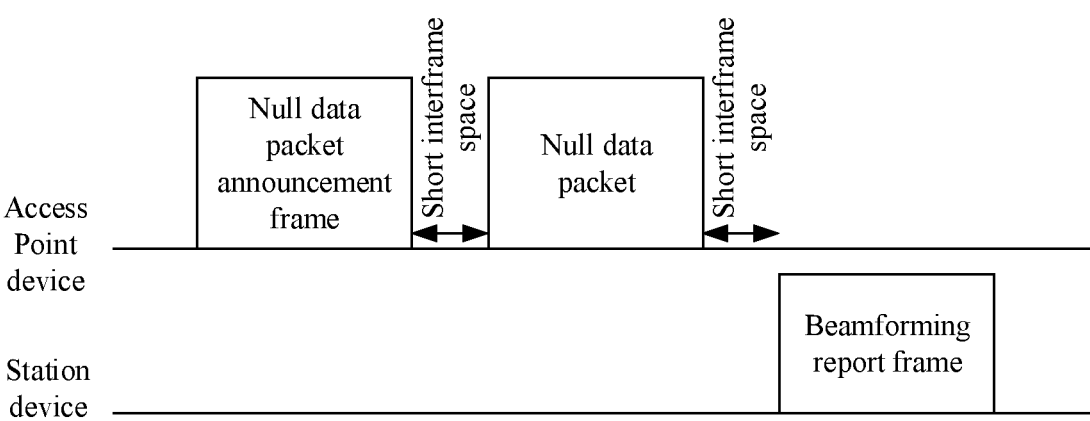
FIG. 1 is a signal diagram of a channel sounding method according to an embodiment of this application.

To make objectives, technical solutions, and advantages of this application clearer, the following further describes this application in detail with reference to the accompanying drawings.

In the specification, claims, and accompanying drawings of this application, terms "first", "second", and the like are intended to distinguish between different objects but do not indicate a particular order. In addition, terms "including", "comprising", and any other variant thereof are intended to cover non-exclusive inclusion. For example, a process, method, system, product, or device that includes a series of steps or units is not limited to listed steps or units, but optionally further includes an unlisted step or unit, or optionally further includes another inherent step or unit of the process, method, product, or device.

Mentioning an "embodiment" in this specification means that a particular characteristic, structure, or feature described with reference to the embodiment may be included in at least one embodiment of this application. The phrase appearing in various locations in this specification may not necessarily mean a same embodiment, and is not an independent or optional embodiment exclusive from another embodiment. It is explicitly and implicitly understood by a person skilled in the art that embodiments described in this specification may be combined with another embodiment.

In this application, "at least one piece (item)" means one or more, "a plurality of" means two or more, and "at least two pieces (items)" means two or more than three pieces (including three). The term "and/or" is used to describe an association relationship for describing associated objects and represents that three relationships may exist. For example, "A and/or B" may represent the following three cases: Only A exists, only B exists, and both A and B exist, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

First, a network architecture in embodiments of this application is described.

A channel sounding method provided in this application may be applied to various communication systems, for example, an Internet of Things (IoT) system, a narrowband Internet of Things (NB-IoT) system, or a long term evolution (LTE) system. Alternatively, the communication system may be a fifth generation (5G) communication system, a new communication system (such as 6G) that appears in future communication development, or the like. In addition, the channel sounding method provided in this application may be further applied to a wireless local area network (WLAN) system, such as wireless fidelity (Wi-Fi). The channel sounding method provided in this application may be further applied to the following communication system.

The communication system includes an access point (AP) device and a station (STA) device. The access point device may also be understood as an access point entity, and the station device may also be understood as a station entity. It may be understood that, for ease of description, all access point devices are described as APs, and all station devices are described as STAs in the following.

Figure 2:
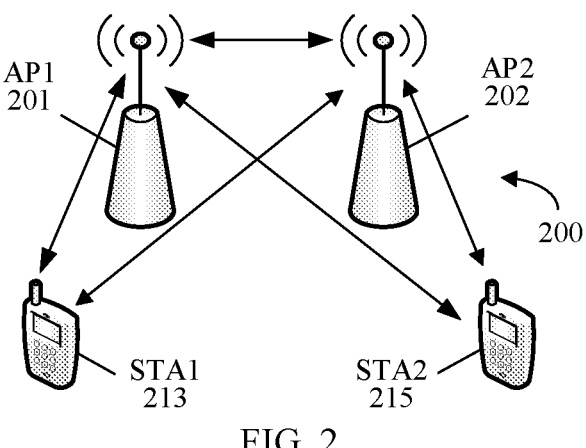
FIG. 2 is a diagram of a communication system according to an embodiment of this application.

The solutions in embodiments of this application may be applied to a scenario with a plurality of APs and one or more STAs. Among the plurality of APs, one AP may serve as a primary AP (master AP), and the primary AP may serve as an access controller to control another secondary AP (slave AP). Alternatively, the plurality of APs may be in a parallel relationship with each other. Any AP may serve as a temporary primary AP to initiate cooperative transmission with another AP. Data transmission between the plurality of APs may be performed through a wired connection, or may be performed through a wireless connection. As an example, FIG. 2 is a diagram of a communication system according to an embodiment of this application. FIG. 2 shows two APs that are an AP1 and an AP2, and two STAs that are a STA1 and a STA2.

An AP may be an access point used by a terminal device such as a mobile phone to access a wired (or wireless) network. APs are mainly deployed at home, in a building, and in a campus. A typical coverage radius ranges from tens of meters to hundreds of meters. Certainly, the APs may also be deployed outdoors. The AP is equivalent to a bridge connecting a wired network and a wireless network. A main function of the AP is to connect wireless network clients, and then connect the wireless network to the Ethernet. The access point may be a terminal device (such as a mobile phone) or a network device (such as a router) with a wireless fidelity (Wi-Fi) chip. The AP may be a device that supports 802.11be or a next-generation standard of 802.11be, and the AP may also be compatible with and support a plurality of wireless local area network (WLAN) standards such as 802.11ax, 802.11ac, 802.11n, 802.11g, 802.11b, and 802.11a. The STA may be a wireless communication chip, a wireless sensor, a wireless communication terminal, or the like. For example, the STA may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, an in-vehicle communication device supporting a Wi-Fi communication function, a computer supporting a Wi-Fi communication function, an Internet of Things device supporting a Wi-Fi communication function, a vehicle-to-everything device, or the like. Optionally, the STA may support 802.11be or a next-generation standard of 802.11be, and the STA may also be compatible with and support a plurality of wireless local area network (WLAN) standards, such as 802.11ax, 802.11ac, 802.11n, 802.11g, 802.11b, and 802.11a.

It may be understood that a method for distinguishing a primary AP from a secondary AP is not limited in embodiments of this application.

The following describes in detail the channel sounding method provided in embodiments of this application.

Figure 4:
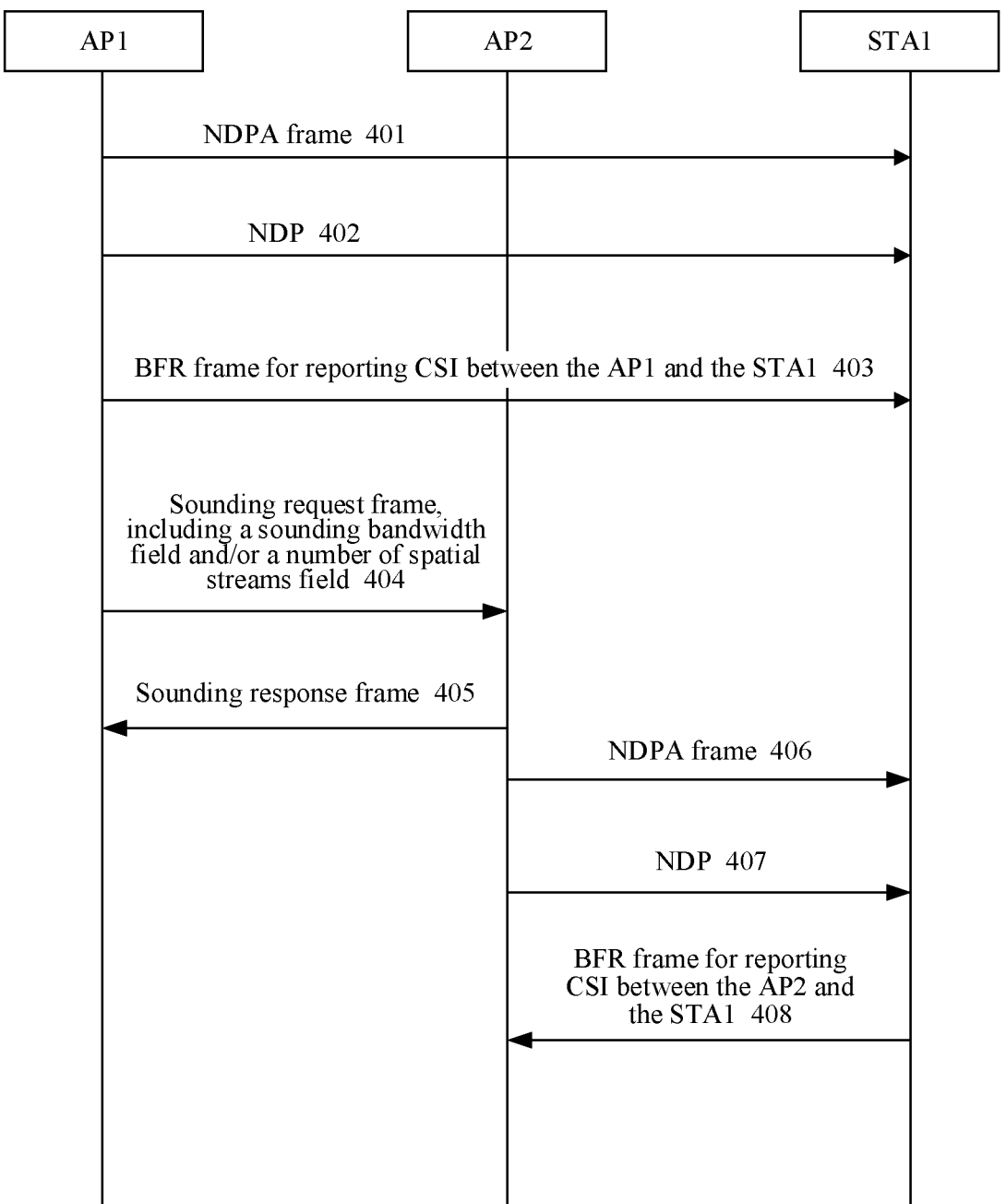
FIG. 4 is a flow diagram of a channel sounding method according to an embodiment of this application.

FIG. 4 is a flow diagram of a channel sounding method according to an embodiment of this application. The channel sounding method may be applied to the communication system in FIG. 2. An example in which a first access point device is an AP1 and a second access point device is an AP2 is used in the following description. Alternatively, in some embodiments, the second access point device may be an AP2 and an AP3. As an example, the AP1 may be further understood as a primary AP, and the AP2 may be further understood as a secondary AP.

As shown in FIG. 4, the channel sounding method includes the following steps.

404: The AP1 sends a sounding request frame to the AP2, where the sounding request frame is for requesting the AP2 to perform channel sounding, the sounding request frame includes a sounding bandwidth field and/or a number of spatial streams field, the sounding bandwidth field is used to indicate a bandwidth for performing channel sounding, and the number of spatial streams field is used to indicate a quantity of spatial streams on which channel sounding is performed. Correspondingly, the AP2 receives the sounding request frame sent by the AP1.

In this embodiment of this application, the sounding request frame is for requesting the AP2 to perform channel sounding. It may also be understood that the sounding request frame is for requesting the AP2 to initiate channel sounding and perform channel sounding between the AP2 and a STA (for example a STA1, or a STA1 and a STA2), to obtain a channel measurement result, for example, channel state information CSI, between the AP2 and the STA. As a scheduler of channel sounding, the AP1 may schedule all information, so as to implement joint transmission. Therefore, the AP1 indicates, based on the sounding request frame, the AP2 to perform channel sounding. That is, the AP2 may perform channel sounding based on the information indicated by the sounding request frame.

The sounding bandwidth used by the AP2 to perform channel sounding may be indicated by the sounding bandwidth field, and the quantity of spatial streams on which the AP2 performs channel sounding may be indicated by the number of spatial streams field. That is, the AP2 may determine, based on the sounding bandwidth field in the sounding request frame, the sounding bandwidth used by the AP2 to perform channel sounding; and determine, based on the number of spatial streams field, the quantity of spatial streams on which the AP2 performs sounding. Optionally, the bandwidth used by the AP2 to perform channel sounding may be the same as the bandwidth used by AP1 to perform channel sounding. Whether the quantity of spatial streams on which the AP2 performs channel sounding is the same as the quantity of spatial streams on which the AP1 performs channel sounding is not limited in this embodiment of this application. For example, the AP1 has 16 antennas, and can measure channels of 16 spatial streams. The AP2 has eight antennas. Therefore, the AP1 may indicate the AP2 to measure channels of eight spatial streams. Optionally, the quantity of spatial streams on which the AP2 performs channel sounding may be the same as the quantity of spatial streams on which AP1 performs channel sounding.

In an embodiment, before the AP1 sends the sounding request frame to the AP2, the method shown in FIG. 4 further includes the following steps:

401: The AP1 sends an NDPA frame to the STA1. Correspondingly, the STA1 receives the NDPA frame sent by the AP1.

402: The AP1 sends an NDP to the STA1. Correspondingly, the STA1 receives the NDP sent by the AP1.

403: The STA1 sends a beamforming report frame to the AP1, where the beamforming report frame is used to report a channel measurement result, for example, CSI, between the AP1 and the STA1. Correspondingly, the AP1 receives the beamforming report frame sent by the STA1, to obtain the CSI between the AP1 and the STA1.

For example, the bandwidth used by the AP1 to perform channel sounding is 160 MHz, and the quantity of spatial streams is 8. In this case, the bandwidth used by the AP2 to perform channel sounding may also be 160 MHz, and the quantity of spatial streams may also be 8. For another example, the bandwidth used by the AP1 to perform channel sounding is 320 MHz, and the quantity of spatial streams is 16. In this case, the bandwidth used by the AP2 to perform channel sounding may also be 320 MHz, and the quantity of spatial streams may be 8. Bandwidths used by the AP1 and the AP2 are the same, and the AP1 and the AP2 may perform coordinated transmission based on a same channel, thereby better implementing joint transmission and improving joint transmission efficiency.

In an embodiment, the sounding request frame further includes an access point identifier field.

The access point identifier field is used to indicate identification information of the second access point device.

In this embodiment of this application, if there is one second access point device, for example, the AP2, the AP2 may be identified by using a receiving address. If there are a plurality of second access point devices, for example the AP2 and the AP3, the second access point devices are identified as follows: A receiving address is set to a broadcast address; or the sounding request frame does not include a receiving address, and the second access point device is indicated by using the access point identifier field. As an example, the access point identifier field may indicate a quantity of second access point devices and identification information of each second access point device. For example, the identification information of the second access point device may be a medium access control (MAC) address of the AP, or may be referred to as a basic service set identifier (BSSID). For another example, an ID may be separately set for each second access point device. How to set an ID for each second access point device is not limited in this embodiment of this application.

In this embodiment of this application, the access point identifier field may further include a sounding dialog token used when the AP1 performs channel sounding. Therefore, the AP2 learns of the correspondence between the ongoing channel sounding and a channel sounding process performed by the AP1.

Figure 6:
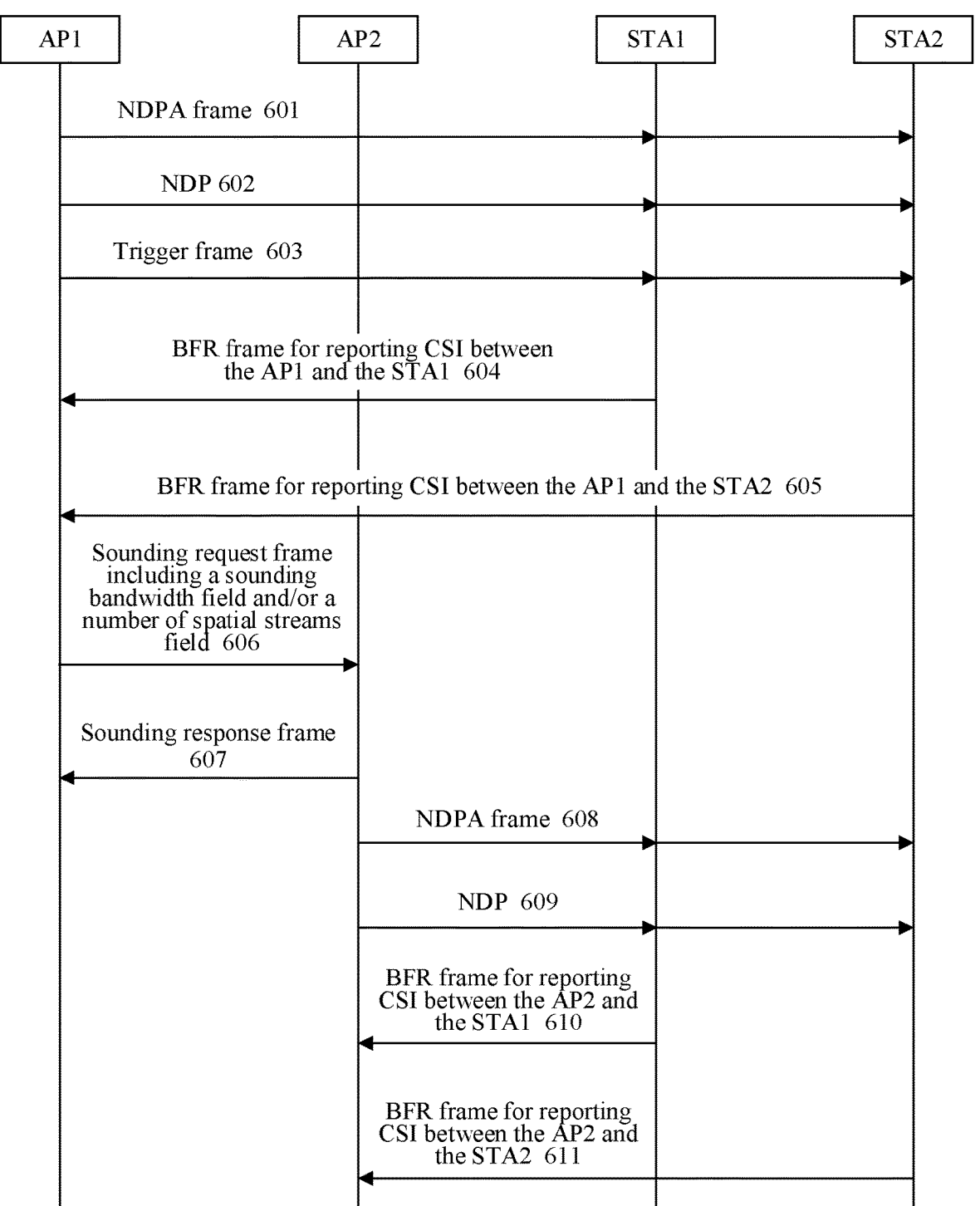
FIG. 6 is a flow diagram of a channel sounding method according to an embodiment of this application.

It may be understood that, for a channel sounding method with participation of a plurality of second access point devices, refer to FIG. 6. Details are not described herein.

In an embodiment, the sounding request frame further includes a station information field, and the station information field is used to indicate identification information of a station device. The identification information of the station device includes an association identifier of the station device; or the identification information of the station device includes an association identifier of the station device and identification information of an access point device associated with the station device.

Optionally, the identification information of the station device, such as an association identifier (AID), may be configured by the AP1. For example, if the AP1 and the AP2 share one AID space, AIDs of STAs associated with different APs are not duplicate. For another example, if the AP1, the AP2, and the AP3 share one AID space, AIDs of STAs associated with different APs are not duplicate.

Optionally, the identification information of the station device may alternatively include an AID of the station device and an identifier of the AP. The AID and the identifier of the AP may be used to identify a STA associated with the AP. For example, if the AP1 is associated with the STA1, the identifier of the STA1 may be identified by the AID and identification information of the AP1.

Optionally, the identification information of the station device may alternatively be a MAC address, so as to identify the STA.

It may be understood that, for a channel sounding method with participation of a plurality of station devices, refer to FIG. 6. Details are not described herein.

In an embodiment, the sounding request frame may further include one or more of a number of grouping (Ng), a codebook size, and a feedback type. For example, the AP2 may perform channel sounding based on the quantity of grouping indicated in the sounding request frame. For example, a quantity of grouping included in the NDPA frame sent by the AP2 may be determined based on the sounding request frame. For another example, a codebook size included in the NDPA frame sent by the AP2 may also be determined based on the sounding request frame.

Figure 5A:
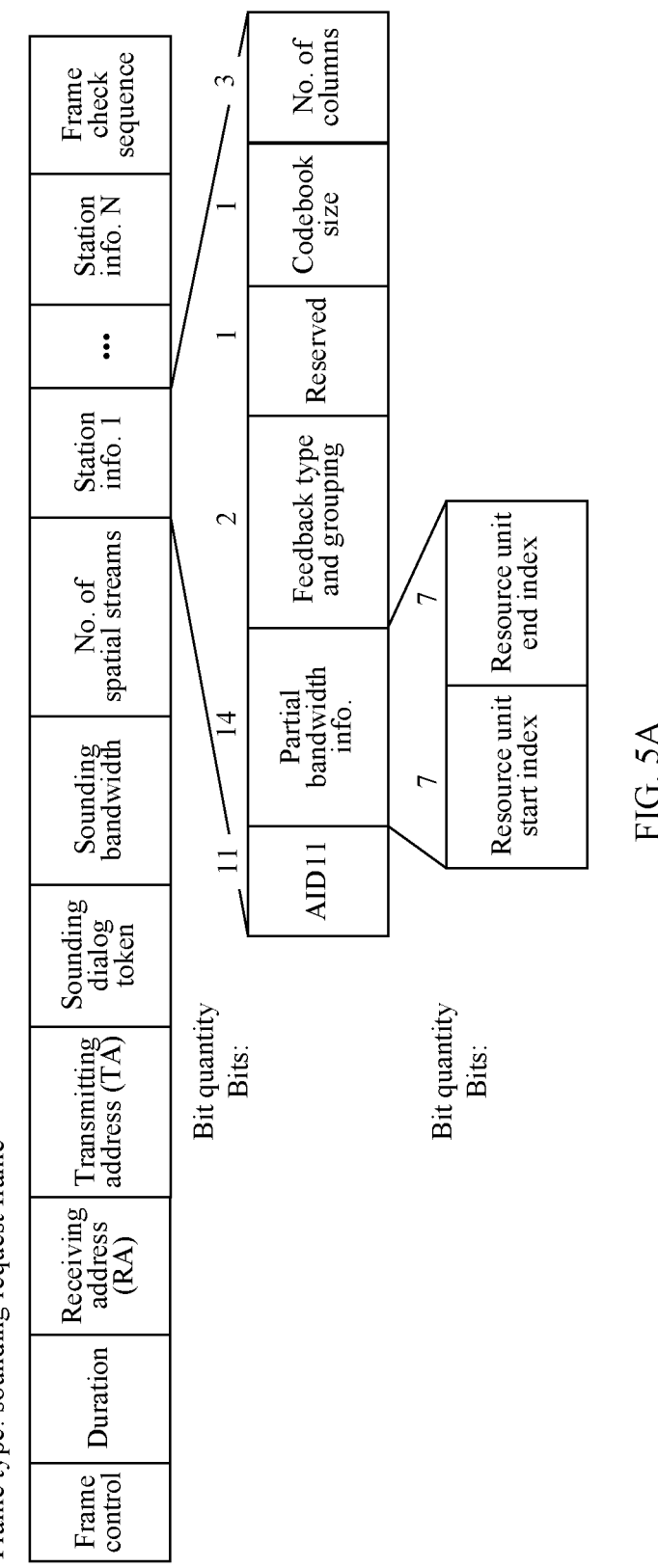
FIG. 5A is a diagram of a frame structure of a sounding request frame according to an embodiment of this application.
Figure 5B:
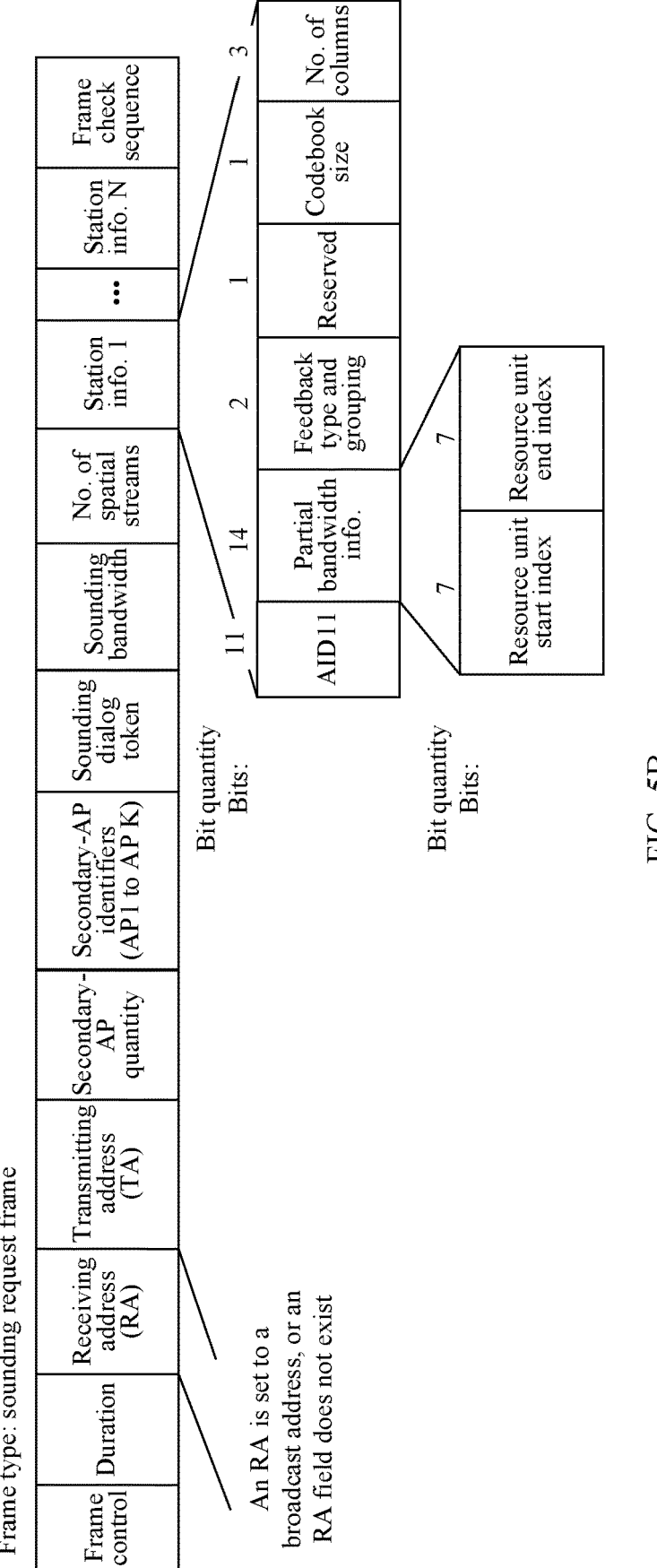
FIG. 5B is a diagram of a frame structure of a sounding request frame according to an embodiment of this application.

As an example, FIG. 5A and FIG. 5B each is a diagram of a frame structure of a sounding request frame according to an embodiment of this application.

A receiving address in FIG. 5A may be a broadcast address, or the receiving address in FIG. 5A may be a MAC address of the second access point device, for example, the AP2. When there are a plurality of second access point devices, the plurality of second access point devices may be identified by using secondary AP identifiers (AP2 to AP K) in FIG. 5B. It may be understood that, for implementations of the sounding bandwidth field, the number of spatial streams field, the secondary AP identifier (AP2 to AP K) field, a receiving address field, and a transmitting address field, refer to the foregoing descriptions. Details are not described herein again. For example, the receiving address may be a receiving address of the AP2, or the receiving address may be a broadcast address or the like. For example, the transmitter address may be a MAC address of the AP1, or the like. It may be understood that only one number of spatial streams field is shown in FIG. 5A and FIG. 5B. If a plurality of second access point devices (for example, the AP2 and the AP3) are indicated to perform channel sounding, the number of spatial streams field shown in FIG. 5A and FIG. 5B may be replaced with a number of spatial streams field of the AP2 and a number of spatial streams field of the AP3.

In an example, a station information 1 field to a station information N field in FIG. 5A and FIG. 5B may be separately used to identify different STAs. As shown in FIG. 5A, the station information 1 field may include an AID11 (that is, an AID of a STA corresponding to the station information 1) subfield, a partial bandwidth information (partial BW info) subfield, a feedback type and grouping (feedback type and Ng) subfield, a codebook size subfield, a number of columns (Nc) subfield, and a reserved (reserved) subfield. FIG. 5A may show a quantity of bits occupied by each subfield. For example, the AID11 occupies 11 bits, and the partial bandwidth information subfield occupies 14 bits. It may be understood that the STA corresponding to the station information 1 subfield is used as an example below to describe a function of each subfield. The partial bandwidth information (partial BW Info) subfield is used to indicate the STA to feed back channel state information of partial bandwidth. The feedback ranges from a resource unit (RU) start index to an RU end index, which indicate consecutive RUs. The number of grouping (Ng) is used to indicate that Ng subcarriers are grouped into one group, and the group of subcarriers needs to feed back channel state information as a whole, so as to reduce compression for feedback. The codebook size is used to indicate quantization precision, and different precision corresponds to different overheads. The number of columns (Nc) is used to indicate a quantity of columns of channel state information that the STA needs to feed back.

Optionally, when there are a plurality of second access point devices, a sequence of the secondary AP identifiers AP2 to APK may be further used to indicate a sequence in which the second access point devices perform channel sounding. For a method for performing channel sounding by any one (for example, the AP2) of the plurality of second access point devices, refer to the method shown in FIG. 6. Details are not described herein.

It may be understood that the frame structures of the sounding request frames shown in FIG. 5A and FIG. 5B are merely examples, and should not be construed as a limitation on this embodiment of this application.

In an embodiment, after the AP1 sends the sounding request frame to the AP2, the method shown in FIG. 4 further includes the following steps.

405: The AP2 sends a sounding response frame to the AP1. Correspondingly, the AP1 receives the sounding response frame sent by the AP2.

The sounding response frame is used to respond to the sounding request frame.

In an example, the sounding response frame may have a same function as an acknowledgment frame, that is, the sounding response frame may be used to indicate that the sounding request frame has been received, and channel sounding is performed based on the indicated information. In an example, the sounding response frame may be further used to indicate that the sounding request frame has been received, but channel sounding is or is not completely performed as indicated. For example, the sounding response frame may include a reason field, and the reason field may be used to indicate a reason why the AP2 can or cannot completely perform channel sounding as indicated. For example, the reason may include that the CSI between the AP2 and the STA1 already exists. The sounding response frame may further indicate the identifier of the STA1. For another example, the AP2 is not expected to perform coordinated transmission between APs, and therefore is not expected to perform channel sounding required by the AP1. For another example, a cell load is heavy (heavy traffic or a short idle period), and channel sounding required by the AP1 is not desired.

It may be understood that after the AP2 sends the sounding response frame to the AP1, the AP2 may perform channel sounding based on the sounding request frame, to obtain a channel measurement result, for example, CSI, between the AP2 and the STA1.

In an embodiment, the sounding request frame may be further used to indicate to share a transmission opportunity. That is, after the AP1 sends the sounding request frame to the AP2 and the AP2 receives the sounding request frame, the AP2 may perform channel sounding with the STA1 by using the transmission opportunity shared by the AP1, to obtain the channel measurement result, for example, the CSI, between the AP2 and the STA1.

A method in which the AP2 performs channel sounding based on the sounding request frame to obtain the channel measurement result between the AP2 and the STA1 is shown in following steps 406 to 408.

406: The AP2 sends an NDPA frame to the STA1. Correspondingly, the STA1 receives the NDPA frame sent by the AP2.

In this embodiment of this application, parameter information indicated by the NDPA frame may be determined based on the information indicated in the sounding request frame. For example, the NDPA frame includes a station information field, and partial bandwidth information included in the station information field may be determined based on the sounding bandwidth field. For another example, a feedback type and grouping included in the station information may be determined based on the feedback type and grouping subfield in the sounding request frame. For another example, a codebook size included in the station information may also be determined based on the codebook size subfield in the sounding request frame. For another example, an association identifier and a quantity of columns included in the station information may be determined based on the sounding request frame.

407: The AP2 sends an NDP to the STA1, where a sounding bandwidth field of the NDP is determined based on the sounding bandwidth field in the sounding request frame, and a number of spatial streams field of the NDP is determined based on the number of spatial streams field in the sounding request frame. Correspondingly, the STA1 receives the NDP sent by the AP2.

Optionally, before the AP2 sends the NDP to the STA1, the AP2 may determine the bandwidth field of the NDP based on the sounding bandwidth field in the sounding request frame sent by the AP1, and determine the number of spatial streams field of the NDP based on the number of spatial streams field in the sounding request frame; or determine the number of space-time streams field of the NDP based on the number of spatial streams field in the sounding request frame.

That is, the number of space-time streams field of the NDP may also be determined based on the number of spatial streams field in the sounding request frame. Optionally, the sounding bandwidth indicated by the bandwidth field of the NDP may be the same as the sounding bandwidth used by the AP1 to perform channel sounding. Optionally, the quantity of spatial streams indicated by the number of spatial streams field (or number of space-time streams field) of the NDP may be the same as the quantity of spatial streams on which the AP1 performs channel sounding.

408: The STA1 sends a beamforming report frame to the AP2, where the beamforming report frame is used to report channel state information between the AP2 and the STA1. Correspondingly, the AP2 receives the beamforming report BFR frame sent by the STA1.

In this embodiment of this application, the STA1 may alternatively determine the CSI between the STA1 and the AP2 based on the NDPA frame sent by the AP2. For example, the STA1 may determine the CSI between the STA1 and the AP2 based on the codebook size, quantity of columns, and quantity of grouping indicated by the NDPA frame.

Optionally, in the channel sounding method shown in FIG. 4, a transmission time interval between the NDPA frame and the NDP may be a SIFS. For example, the AP1 sends the NDPA frame, and the AP1 sends the NDP after the SIFS elapses. For another example, the AP2 sends the NDPA frame, and the AP2 sends the NDP after the SIFS elapses.

It may be understood that, in addition to reporting CSI between an access point device and a station device, the BFR frame in this application may also include other information. This is not limited in this application.

It may be understood that, in the channel sounding method shown in FIG. 4, an example in which the access point device is an initiator is used. However, in actual application, the station device may also be used as an initiator.

Figure 3:
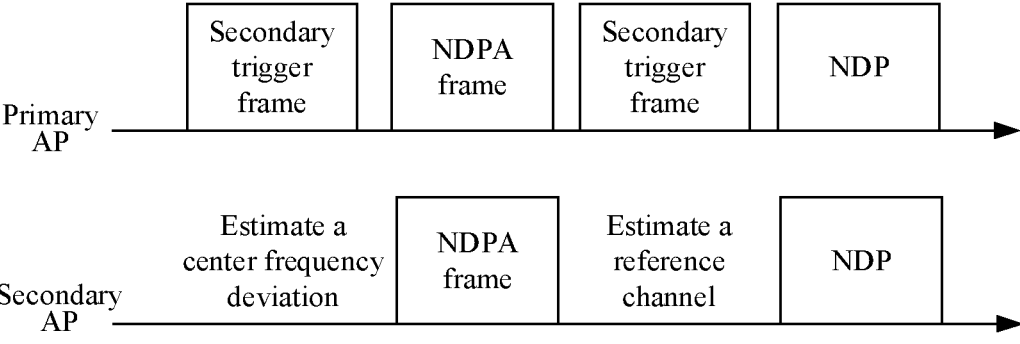
FIG. 3 is a signal diagram of a channel sounding method according to an embodiment of this application.

In this embodiment of this application, a procedure in which a single AP performs channel sounding does not need to be changed, and therefore has better compatibility and is easy to implement, compared with the solution shown in FIG. 3. In addition, the primary AP may control and adjust all sounding parameters used when the secondary AP performs channel sounding. In this way, a channel sounding result is more conducive to coordinated transmission between APs, and efficiency is higher. FIG. 3 is a signal diagram of a channel sounding method according to an embodiment of this application. As an example, among a plurality of APs participating in distributed multiple-input multiple-output (D-MIMO) transmission, there is one primary AP and one or more secondary APs. As shown in FIG. 3, the channel sounding method includes the following steps.

(301) The primary AP sends a secondary trigger frame (slave trigger) to the secondary AP.

(302) After receiving the secondary trigger frame sent by the primary AP, the secondary AP estimates a center frequency deviation (CFO).

(303) The primary AP sends an NDPA frame to a STA, and the secondary AP sends the NDPA frame to the STA, so as to notify the STA to be ready for channel sounding. It may be understood that FIG. 3 does not show the STA. However, this should not be construed as a limitation on this embodiment of this application.

(304) The primary AP sends a secondary trigger frame to the secondary AP.

(305) After receiving the secondary trigger frame sent by the primary AP, the secondary AP estimates a CFO and a reference signal.

(306) The primary AP sends an NDP to the STA, and the secondary AP sends an NDP to the STA.

It may be understood that, in FIG. 3, after receiving the NDPA frame, the STA may learn that the STA is ready to participate in channel sounding. Further, after the STA receives the NDPs, the STA performs channel estimation to obtain channel state information, and the STA sends a beamforming report frame to the primary AP and the secondary AP.

The channel sounding method provided in this embodiment of this application may also be understood as a method for performing channel sounding by a single AP through time division. In addition, a first access point device and a second access point device have a channel sounding capability, and perform channel sounding in a time division manner without changing a common channel sounding procedure of a single AP. This improves compatibility, avoids simultaneous channel sounding of the first access point device and the second access point device, and reduces implementation complexity and hardware costs of the access point device. An example of channel sounding in a time division manner is as follows: After the first access point device (for example, an AP1) completes a channel sounding procedure to obtain CSI between the first access point device and a station device (for example, a STA1), the first access point device indicates the second access point device (for example, an AP2) to perform a channel sounding procedure based on a sounding request frame.

Further, the second access point device determines, based on the sounding request frame, a sounding bandwidth and a quantity of spatial streams, where the sounding bandwidth and the quantity of spatial streams are for performing channel sounding. In this way, the first access point device and the second access point device can perform coordinated transmission on a same bandwidth and under scheduling (for example, spatial stream allocation) of the first access point device. Implementing this embodiment of this application further improves efficiency of coordinated transmission between the first access point device and the second access point device.

It may be understood that the channel sounding method shown in FIG. 4 is illustrated by using an example in which the first access point device is the AP1, the second access point device is the AP2, and the station device is the STA1. However, in actual application, the second access point device may further include AP3, and the station device may further include the STA2. Therefore, this application further provides a channel sounding method with participation of a plurality of second access point devices and a plurality of station devices. FIG. 6 is a flow diagram of a channel sounding method according to an embodiment of this application.

As shown in FIG. 6, the channel sounding method includes the following steps.

601: An AP1 sends an NDPA frame to a STA1 and a STA2. Correspondingly, the STA1 receives the NDPA frame sent by the AP1, and the STA2 receives the NDPA frame sent by the AP1.

Optionally, the AP1 may send the NDPA frame to the STA1 and the STA2 in a broadcast manner. Alternatively, the AP1 may separately send the NDPA frame to the STA1 and the STA2 in a unicast manner.

602: The AP1 sends an NDP to the STA1 and the STA2. Correspondingly, the STA1 receives the NDP sent by the AP1, and the STA2 receives the NDP sent by the AP1.

Optionally, the AP1 may send the NDP to the STA1 and the STA2 in a broadcast manner. Alternatively, the AP1 may separately send the NDP to the STA1 and the STA2 in a unicast manner.

603: The AP1 sends a trigger frame (TF) to the STA1 and the STA2. Correspondingly, the STA1 receives the trigger frame sent by the AP1, and the STA2 receives the trigger frame sent by the AP1.

It may be understood that the trigger frame may be used to trigger the STA1 and the STA2 to send a BFR frame to the AP1. Optionally, the trigger frame may be used to trigger STA1 and the STA2 to simultaneously send a BFR frame to the AP1. A manner of sending the BFR frame by the STA1 and the STA2 is not limited in this embodiment of this application. It may be understood that the AP1 may send the trigger frame in a broadcast manner, or may send the trigger frame in a unicast manner.

604: The STA1 sends a BFR frame to the AP1, where the BFR frame is used to report CSI between the AP1 and the STA1. Correspondingly, the AP1 receives the BFR frame sent by the STA1, to obtain the CSI between the AP1 and the STA1.

605: The STA2 sends a BFR frame to the AP1, where the BFR frame is used to report CSI between the AP1 and the STA2. Correspondingly, the AP1 receives the BFR frame sent by the STA2, to obtain the CSI between the AP1 and the STA2.

In an example, when the AP1 does not correctly receive the BFR frame sent by the STA1 and/or the STA2, steps 603 to 605 shown in FIG. 6 may be further repeatedly performed. A time sequence in which the STA1 and the STA2 send the BFR frame to the AP1 is not limited in this embodiment of this application.

Alternatively, the foregoing steps 603 to 605 may be replaced with:

(6031) The AP1 sends a trigger frame to the STA1, and the STA1 receives the trigger frame and sends a BFR frame to the AP1.

(6041) The AP1 sends a trigger frame to the STA2, and the STA2 receives the trigger frame and sends a BFR frame to the AP1.

(606) The AP1 sends a sounding request frame to an AP2, where the sounding request frame is for requesting the AP2 to perform channel sounding, the sounding request frame includes a sounding bandwidth field and/or a number of spatial streams field, the sounding bandwidth field is used to indicate a bandwidth for performing channel sounding, and the number of spatial streams field is used to indicate a quantity of spatial streams on which channel sounding is performed.

607: The AP2 sends a sounding response frame to the AP1. Correspondingly, the AP1 receives the sounding response frame sent by the AP2.

In an embodiment, when there are a plurality of second access point devices, the foregoing steps 606 and 607 may be replaced with the following three implementations.

Implementation 1

Figure 7A:
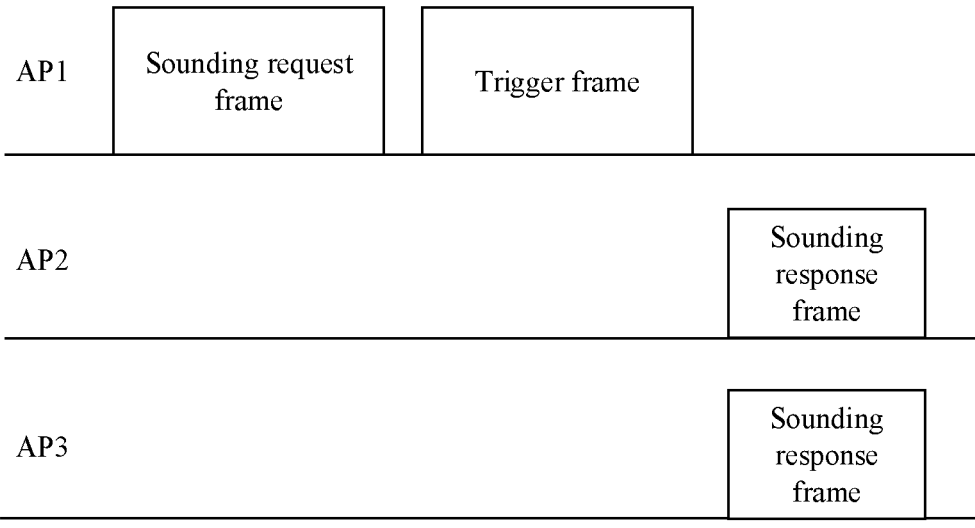
FIG. 7A is a signal diagram of a method for performing interaction between a plurality of APs according to an embodiment of this application.

FIG. 7A is a signal diagram of a method for performing interaction between a plurality of APs according to an embodiment of this application. As shown in FIG. 7A, the foregoing steps 606 and 607 may be replaced as follows:

(6061) The AP1 sends a sounding request frame to the AP2 and an AP3. Correspondingly, the AP2 receives the sounding request frame sent by the AP1, and the AP3 receives the sounding request frame sent by the AP1.

(6062) The AP1 sends a trigger frame to the AP2 and the AP3, where the trigger frame is used to trigger the AP2 and the AP3 to feed back a sounding response frame. Correspondingly, the AP2 receives the trigger frame sent by the AP1, and the AP3 receives the trigger frame sent by the AP1.

(6063) The AP2 sends a sounding response frame to the AP1, and the AP3 sends a sounding response frame to the AP1. Correspondingly, the AP1 receives the sounding response frame sent by the AP2, and receives the sounding response frame sent by the AP3.

In implementation 1, the AP1 sends the trigger frame to the AP2 and the AP3, so that the AP2 and the AP3 can feed back the sounding response frame to the AP1 in a timely manner. This improves response efficiency.

Implementation 2

Figure 7B:
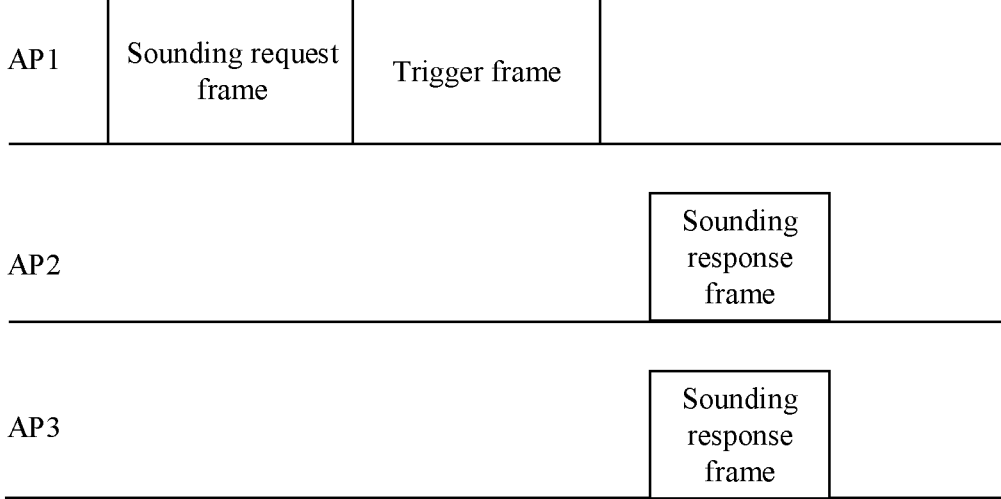
FIG. 7B is a signal diagram of a method for performing interaction between a plurality of APs according to an embodiment of this application.

FIG. 7B is a signal diagram of a method for performing interaction between a plurality of APs according to an embodiment of this application. As shown in FIG. 7B, the foregoing steps 606 and 607 may be replaced as follows:

(6064) The AP1 sends an aggregate frame A-MPDU to the AP2 and the AP3, where the aggregate frame includes a sounding request frame and a trigger frame, and the trigger frame is used to trigger the AP2 and the AP3 to feed back a sounding response frame.

(6065) The AP2 sends a sounding response frame to the AP1, and the AP3 sends a sounding response frame to the AP1. Correspondingly, the AP1 receives the sounding response frame sent by the AP2, and receives the sounding response frame sent by the AP3.

In implementation 2, the sounding request frame and the trigger frame are aggregated into one A-MPDU frame. In this way, the AP2 and the AP3 can feed back the sounding response frame in a timely manner, and can further reduce overheads of a physical layer preamble.

Implementation 3

Figure 7C:
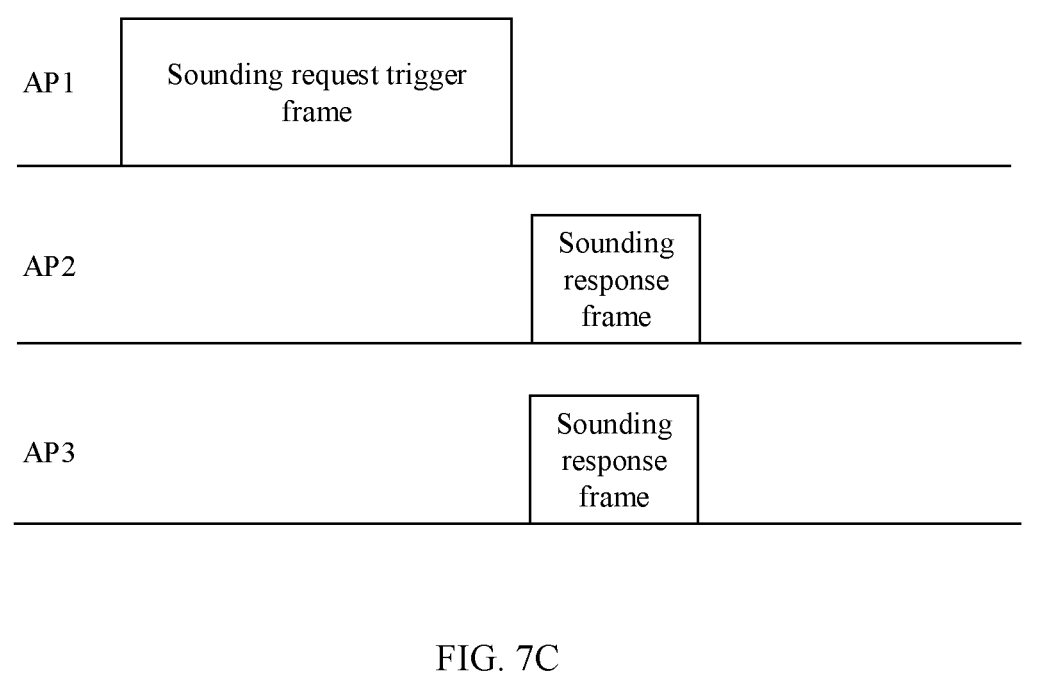

FIG. 7C is a signal diagram of a method for performing interaction between a plurality of APs according to an embodiment of this application. As shown in FIG. 7C, the foregoing steps 606 and 607 may be replaced as follows:

(6066) The AP1 sends a sounding request frame to the AP2 and the AP3. Correspondingly, the AP2 receives the sounding request frame sent by the AP1, and the AP3 receives the sounding request frame sent by the AP1, where the sounding request frame further includes scheduling information used by the AP2 to send a sounding response frame and scheduling information used by the AP3 to send a sounding response frame.

(6067) The AP2 sends a sounding response frame to the AP1, and the AP3 sends a sounding response frame to the AP1. Correspondingly, the AP1 receives the sounding response frame sent by the AP2, and receives the sounding response frame sent by the AP3.

In implementation 3, one sounding request frame is used both to request the AP2 and the AP3 to perform channel sounding, and to trigger the AP2 and the AP3 to feed back the sounding response frame. Compared with implementation 2, implementation 3 further reduces signaling overheads.

Figure 8:
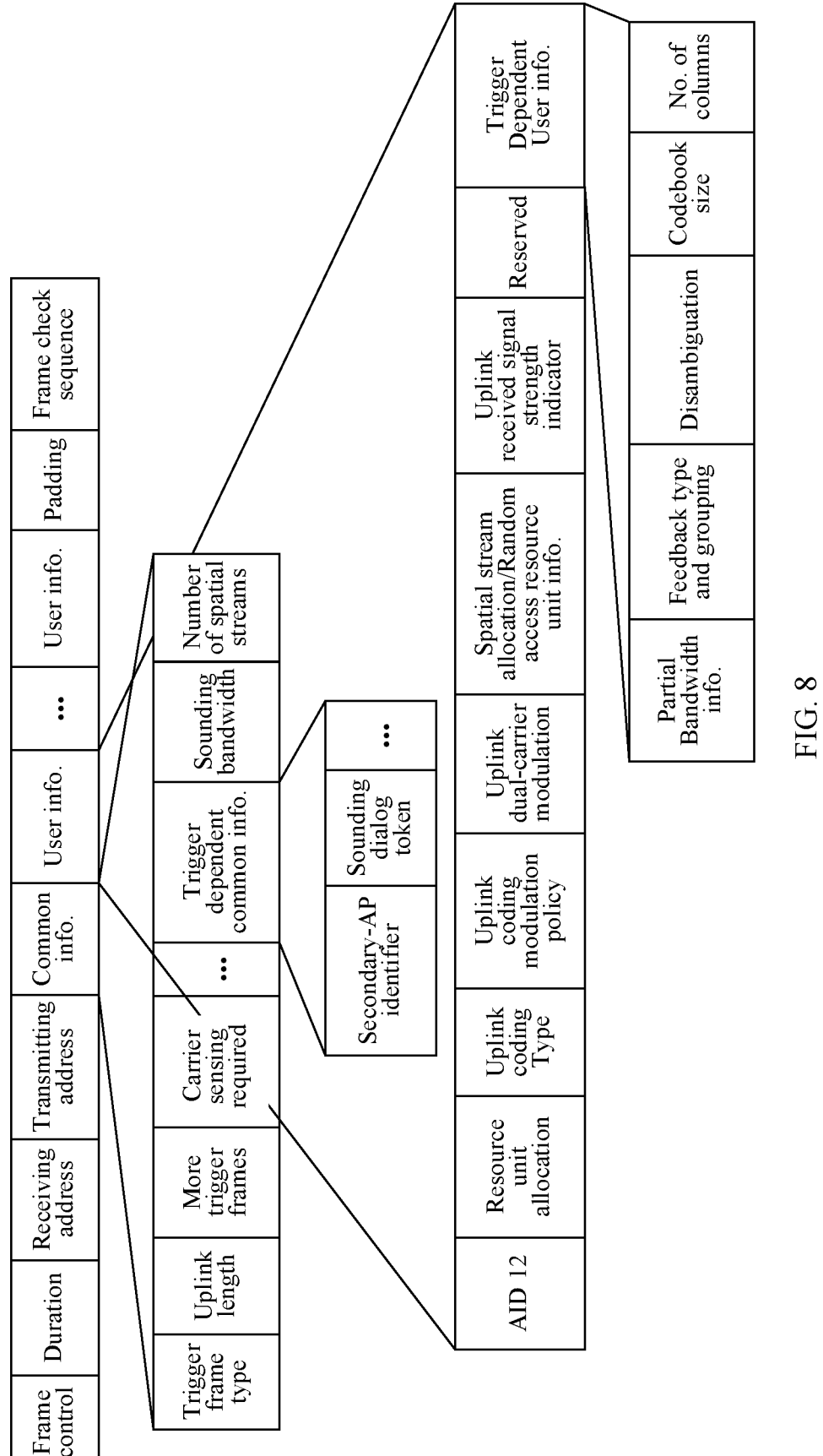
FIG. 8 is a diagram of a frame structure of a sounding request trigger frame according to an embodiment of this application.

It may be understood that a sounding request trigger frame in FIG. 7C is the sounding request frame described in the foregoing step 6066. As an example, FIG. 8 is a diagram of a frame structure of a sounding request trigger frame according to an embodiment of this application. As shown in FIG. 8, the sounding request trigger frame may include a common information field and a user information field. The common information field may include a sounding bandwidth subfield and a number of spatial streams subfield. For the sounding bandwidth subfield and the number of spatial streams subfield, refer to FIG. 4. Details are not described herein again. The common information field includes a trigger dependent common information subfield, and the trigger dependent common information subfield may include a secondary AP identifier subfield and a sounding dialog token subfield. The user information field may include a trigger dependent user information subfield, and the trigger dependent user information subfield may be used to indicate information about a station device.

For the foregoing three implementations, after the AP2 and the AP3 receive the sounding request frame, the AP2 and the AP3 may perform channel sounding by using the transmission opportunity shared by the AP1. For a sequence in which the AP2 and the AP3 perform channel sounding, the sounding request frame may include a sequence or a time point of channel sounding performed by the second access point devices such as the AP2 and the AP3. For another example, after the AP2 completes the channel sounding procedure to obtain the CSI between the AP2 and the station devices (such as the STA1 and the STA2), the AP2 may further notify a next AP (such as the AP3) that needs to perform a channel sounding procedure. For another example, a sequence in which secondary APs perform channel sounding may be determined based on a sequence of the secondary AP identifiers in the sounding request frame. As an example, a sequence of the AP2 to the AP K of the secondary AP identifiers is a sequence in which the second access point devices perform channel sounding. An advantage of this case is to ensure that the AP2 and the AP3 can immediately start channel sounding. Alternatively, each second access point device contends for a channel again, to obtain an opportunity to send an NDPA frame or the like. For example, the AP2 and the AP3 may contend for a channel to obtain a sequence of channel sounding. An advantage of this case is to ensure fairness of channel use.

It may be understood that, in the diagrams FIG. 7A, FIG. 7B, and FIG. 7C, the AP2 and the AP3 feed back the sounding response frame synchronously. Optionally, the AP2 and the AP3 may feed back the sounding response frame asynchronously.

It may be understood that steps 608 to 611 shown below are a procedure in which the AP2 performs channel sounding. For a procedure in which the AP3 performs channel sounding, refer to the procedure of the AP2. Details are not described in this application.

608: The AP2 sends an NDPA frame to a STA1 and a STA2. Correspondingly, the STA1 receives the NDPA frame sent by the AP2, and the STA2 receives the NDPA frame sent by the AP2.

609: The AP2 sends an NDP to the STA1 and the STA2, where a sounding bandwidth field of the NDP is determined based on the sounding bandwidth field in the sounding request frame, and a number of spatial streams field of the NDP is determined based on the number of spatial streams field in the sounding request frame. Correspondingly, the STA1 receives the NDP sent by the AP2, and the STA2 receives the NDP sent by the AP2.

610: The STA1 sends a BFR frame to the AP2, where the BFR frame is used to report channel state information between the AP2 and the STA1. Correspondingly, the AP2 receives the BFR frame sent by the STA1.

611: The STA2 sends a BFR frame to the AP2, where the BFR frame is used to report channel state information between the AP2 and the STA2. Correspondingly, the AP2 receives the BFR frame sent by the STA2.

Optionally, the foregoing steps 610 and 611 may be replaced with:

(6101) The AP2 sends a trigger frame to the STA1, and the STA1 receives the trigger frame and sends a BFR frame to the AP2.

(6111) After receiving the BFR frame sent by the STA1, the AP2 sends a trigger frame to the STA2. The STA2 receives the trigger frame and sends a BFR frame to the AP2.

Optionally, the foregoing steps 610 and 611 may be replaced with:

(6102) The AP2 sends a trigger frame to the STA1 and the STA2, and the STA1 and the STA2 receive the trigger frame, where the trigger frame is used to trigger the STA1 and the STA2 to send a BFR frame to the AP2, or the trigger frame is used to trigger the STA1 and the STA2 to simultaneously send a BFR frame to the AP2.

(6112) The STA1 sends a BFR frame to the AP2, where the BFR frame is used to report channel state information between the AP2 and the STA1. The STA2 sends a BFR frame to the AP2, where the BFR frame is used to report channel state information between the AP2 and the STA2.

This embodiment of this application describes in detail a channel sounding procedure with participation of a plurality of second access point devices and a plurality of station devices. For another implementation in FIG. 6, refer to the description in FIG. 4. Details are not described herein again.

Figure 9:
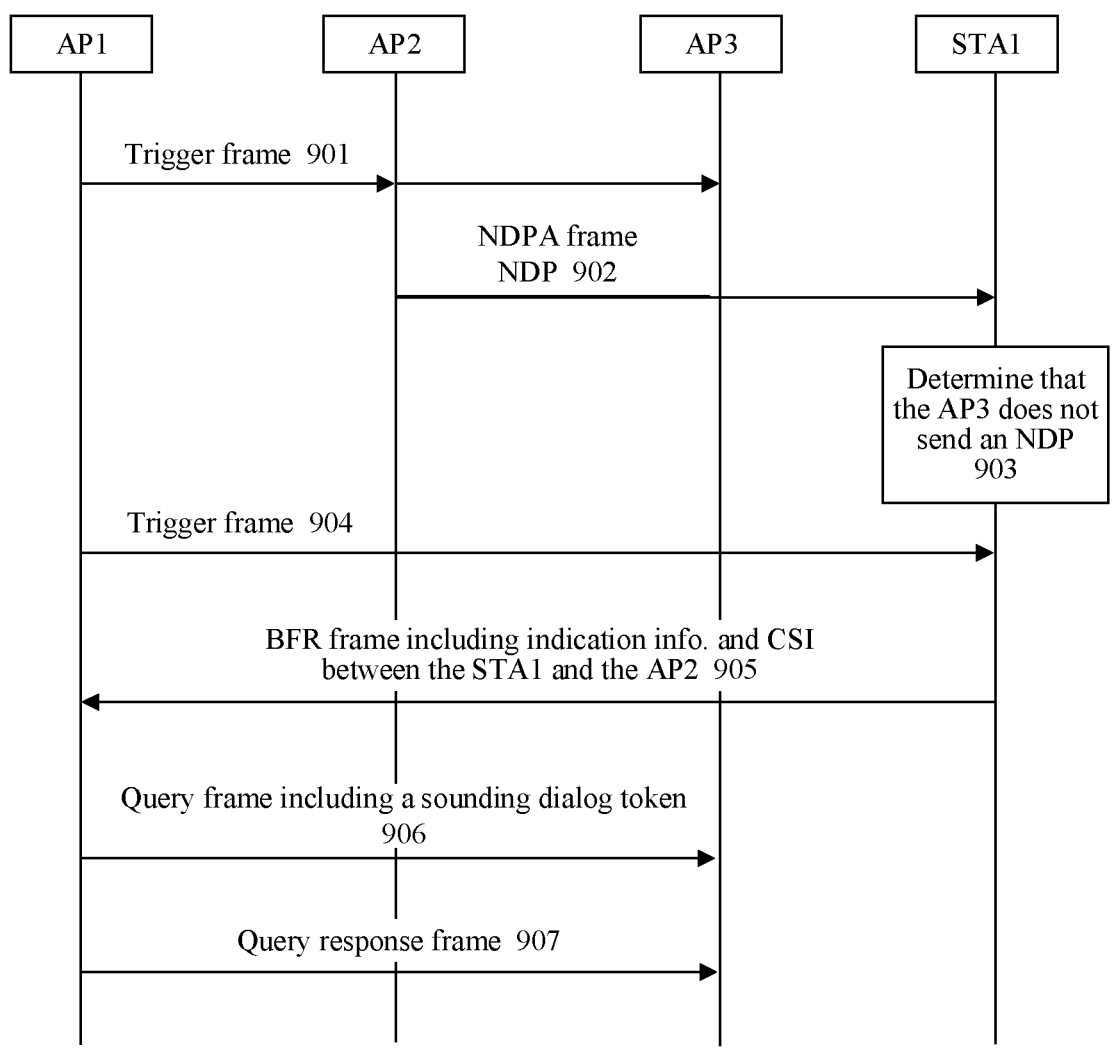
FIG. 9 is a flow diagram of a channel sounding method according to an embodiment of this application.

An embodiment of this application further provides a channel sounding method. The channel sounding method is described by using an example in which a first access point device is an AP1, second access point devices are an AP2 and an AP3, and a station device is a STA1. FIG. 9 is a flow diagram of the channel sounding method according to this embodiment of this application. The method may be applied to the communication system in FIG. 2. As shown in FIG. 9, the channel sounding method includes the following steps:

901: The AP1 sends a trigger frame to the AP2 and the AP3, where the trigger frame is used to trigger the AP2 and the AP3 to perform channel sounding. For example, the trigger frame is used to trigger the AP2 to send an NDPA frame, and trigger the AP3 to send an NDPA frame.

Figures 10A, 10B:
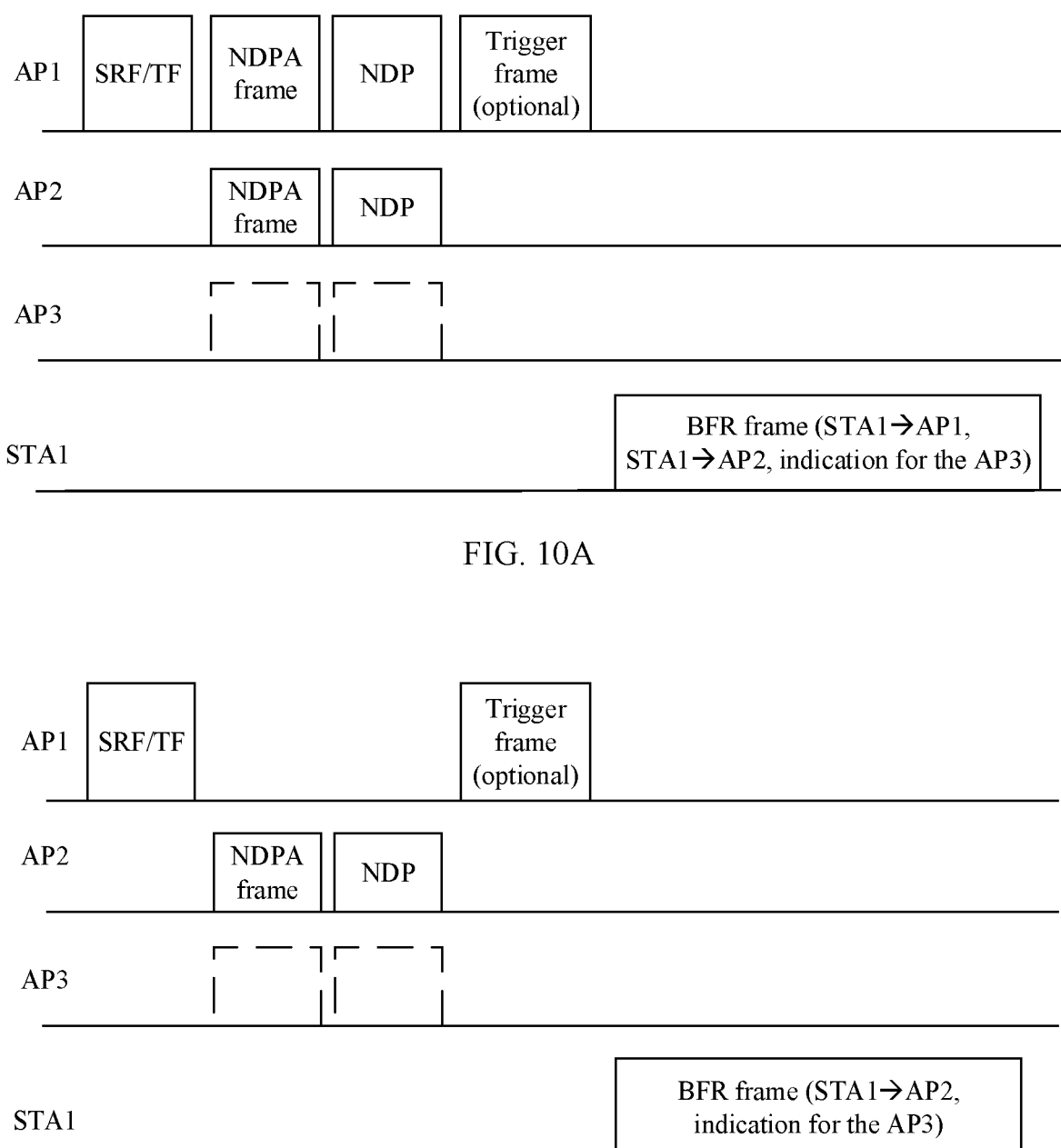
FIG. 10A is a signal diagram of a channel sounding method according to an embodiment of this application.
FIG. 10B is a signal diagram of a channel sounding method according to an embodiment of this application.

It may be understood that after the AP1 sends the trigger frame to the AP2 and the AP3, this embodiment of this application further provides two manners for determining whether the AP1 participates in channel sounding. FIG. 10A and FIG. 10B are signal diagrams of a channel sounding method according to an embodiment of this application.

As shown in FIG. 10A, after sending the trigger frame to the AP2 and the AP3, the AP1 may also perform channel sounding. For example, the AP1 sends an NDPA frame and then an NDP to the STA1. Correspondingly, the STA1 sends a BFR frame to the AP1. The BFR frame further includes CSI between the STA1 and the AP1. The following uses FIG. 10A as an example to describe the channel sounding method provided in this embodiment of this application.

As shown in FIG. 10B, after sending the trigger frame to the AP2 and the AP3, the AP1 may not perform channel sounding. Optionally, the AP1 may have participated in channel sounding or the like before sending the trigger frame to the AP2 and the AP3. This is not limited in this embodiment of this application.

902: The AP2 sends an NDPA frame and then an NDP to the STA1. Correspondingly, the STA1 receives the NDPA frame and the NDP sent by the AP2.

Optionally, the NDPA frame includes a quantity of access point devices that participate in channel sounding, and/or indicates spatial stream allocation information of each access point device. For example, in FIG. 10A, there may be three access point devices that participate in channel sounding. In FIG. 10B, there may be two access point devices that participate in channel sounding. The spatial stream allocation information of each access point device may be used to indicate a quantity of spatial streams of each access point device and a sequence in which the spatial streams are sent. Optionally, the NDP includes a quantity of access point devices that participate in channel sounding, and/or indicates spatial stream allocation information of each access point device. For example, the NDP may include a number of space-time streams (NSTS) on which each access point device performs channel sounding, for example, an NSTS (AP1) field, an NSTS (AP2) field, and an NSTS (AP3) field. For another example, the NDP may also jointly indicate an access point device identifier and number of space-time streams, for example, an AP1 identifier and number space-time streams (AP1 ID, NSTS) field, an AP2 identifier and number of space-time streams (AP2 ID, NSTS) field, and an AP3 identifier and number of space-time streams (AP3 ID, NSTS) field. It may be understood that, the spatial stream allocation information of each access point device is indicated, so that when receiving the NDPA frame and/or the NDP, the STA1 learns of a quantity of spatial streams and sequence corresponding to each access point device, so as to determine an access point device that does not perform channel sounding. It may be understood that a relationship between a quantity of space-time streams and a quantity of spatial streams is not limited in this embodiment of this application. For example, the relationship between the quantity of space-time streams and the quantity of spatial streams may be determined based on a space-time block coding technology.

903: The STA1 determines that the AP3 does not send an NDP.

A method for the STA1 to determine that the AP3 does not send the NDP is: If the STA1 determines that an equivalent signal-to-noise ratio (SNR) of channel state information of a spatial stream from the AP3 is low, the STA1 may determine that the AP3 does not send the NDP. Alternatively, the STA1 determines that channel state information of neighboring subcarriers lacks in correlation, or the like.

It may be understood that the AP3 does not send the NDP, and the reason may be that the channel is busy, the trigger frame is received incorrectly, or the like.

904: The AP1 sends a trigger frame to the STA1, where the trigger frame is used to trigger the STA1 to send a BFR frame. Correspondingly, the STA1 receives the trigger frame sent by the AP1.

It may be understood that when there are a plurality of station devices, for example, a STA1 and a STA2, the AP1 may simultaneously send a trigger frame to the STA1 and the STA2. Alternatively, the AP1 may first send a trigger frame to the STA1, and receive a BFR frame sent by the STA1. Then, the AP1 sends a trigger frame to the STA2, and receives a BFR frame sent by the STA2.

905: The STA1 sends the BFR frame to the AP1, where the BFR frame includes CSI between the STA1 and the AP2 and indication information, and the indication information is used to indicate that the AP3 does not perform channel sounding. Correspondingly, the AP1 receives the BFR frame.

It may be understood that the STA1 may send the BFR frame in a broadcast manner, or may send the BFR frame in a unicast manner. FIG. 10A shows that the STA1 sends the BFR frame in a broadcast manner. A form shown in FIG. 10B may be understood as a unicast manner, or may be understood as broadcast manner.

906: The AP1 sends a query (participation query) frame to the AP3, where the query frame includes a sounding dialog token, and the query frame is used to inquire whether a trigger frame corresponding to the sounding dialog token is received. Correspondingly, the AP3 receives the query frame.

In actual application, an access point device and a station device participate in channel sounding for a plurality of times. Therefore, the sounding dialog token may be used to indicate an $n^{th}$ channel sounding process.

907: The AP3 sends a query response frame to the AP1, where the query response frame is used to respond to the query frame. For example, the query response frame may be used to respond to whether to participate in channel sounding.

It may be understood that the channel sounding method shown in FIG. 9 may be further combined with the methods shown in FIG. 4 and FIG. 6. For example, after the AP1 sends a sounding request frame to the AP2 and the AP3, the AP2 needs to perform channel sounding, and send an NDPA frame and an NDP to the STA1; and the AP3 needs to perform channel sounding, and send an NDPA frame and an NDP to the STA1. However, the STA1 receives only the NDPA frame and the NDP from the AP2. In this case, the STA1 may send a BFR frame to the AP1, where the BFR frame is further used to indicate that the AP3 does not perform channel sounding. Then, the AP1 may send a query frame to the AP3. The query frame includes a sounding dialog token, and the query frame is used to inquire whether a sounding request frame corresponding to the query frame is received. After receiving the query frame, the AP3 may send a query response frame to the AP1.

In this embodiment of this application, a station device (for example, the STA1) identifies an AP that does not participate in channel sounding, so that a first access point device (for example, the AP1) sends a query frame to the AP (for example, the AP3) that does not participate in channel sounding, to determine a reason why the AP3 does not participate in channel sounding. This embodiment of this application provides a method for a first access point device to determine that a second access point device fails to obtain a channel state required for coordinated transmission, improving a multi-AP channel sounding process, and improving channel sounding efficiency.

FIG. 11 is a signal diagram of a channel sounding method according to an embodiment of this application. The channel sounding method is applicable to the communication system shown in FIG. 2. The channel sounding method provided in this embodiment of this application is described by using an example in which a first access point device is an AP1 and second access point devices are an AP2 and an AP3. As shown in FIG. 11, the channel sounding method includes the following step:

(1101) The AP1 sends a trigger frame (TF), where the trigger frame is used to trigger the AP2 and the AP3 to perform channel sounding.

Optionally, the trigger frame may be used to trigger the AP2 and the AP3 to simultaneously perform channel sounding.

The trigger frame may include scheduling information used by the AP2 and the AP3 to perform channel sounding. Optionally, the trigger frame includes one or more of scheduling information used by the AP2 to send an NDPA, scheduling information used by the AP3 to send an NDPA, scheduling information used by the AP2 to send an NDP, and scheduling information used by the AP3 to send an NDP. That is, the trigger frame may include information required by the AP2 and the AP3 to send an NDPA frame and an NDP. It may be understood that the trigger frame sent by the AP1 may also be referred to as a sounding request frame (SRF), a multi-AP channel sounding scheduling frame, or the like. A name of the trigger frame is not limited in this embodiment of this application.

It may be understood that, for whether the AP1 performs channel sounding simultaneously with the AP2 and the AP3, refer to the method shown in FIG. 9. Details are not described herein again.

(1102) The AP2 sends an NDPA frame and then an NDP to the STA1 based on the trigger frame. Correspondingly, the STA1 receives the NDPA frame and the NDP sent by the AP2.

(1103) The AP3 sends an NDPA frame and then an NDP to the STA1 based on the trigger frame. Correspondingly, the STA1 receives the NDPA frame and the NDP sent by the AP3.

(1104) The STA1 sends a BFR frame, where the BFR frame is used to report CSI between the STA1 and the AP1, CSI between STA1 and the AP2, and CSI between the STA1 and the AP3.

Optionally, before the STA1 sends a BFR frame, the AP1 may further send a trigger frame to the STA1, where the trigger frame is used to trigger the STA1 to send a BFR frame.

The following describes in detail how the AP2 and the AP3 send the NDPA frame and the NDP based on the trigger frame.

Optionally, the trigger frame includes a sounding bandwidth field. The sounding bandwidth field is used to indicate a bandwidth used by the AP2 and the AP3 to perform channel sounding. For example, the AP2 may determine, based on the bandwidth indicated by the sounding bandwidth field, a value of a partial bandwidth information subfield included in the NDPA frame. It may be understood that a bandwidth indicated by the partial bandwidth information subfield may be a subset of the bandwidth indicated by the sounding bandwidth field. For another example, the AP2 may determine, based on the bandwidth indicated by the sounding bandwidth field, a value of a bandwidth subfield included in the NDP. Optionally, a bandwidth indicated by the bandwidth subfield included in the NDP may be equal to the bandwidth indicated by the sounding bandwidth field.

Optionally, the trigger frame may further include access point identification information. The access point identification information may be used to indicate identifiers of APs that simultaneously perform channel sounding. For example, the access point identification information may be in a common information field. Optionally, the trigger frame may further include station device identification information. The station device identification information may include an AID, or include an AID and identification information of an AP associated with the station device. For example, the station device identification information may be in a user information field or the like.

It may be understood that, for descriptions of the access point device identification information and the station device identification information, refer to FIG. 4. Details are not described herein again.

Figure 12A:
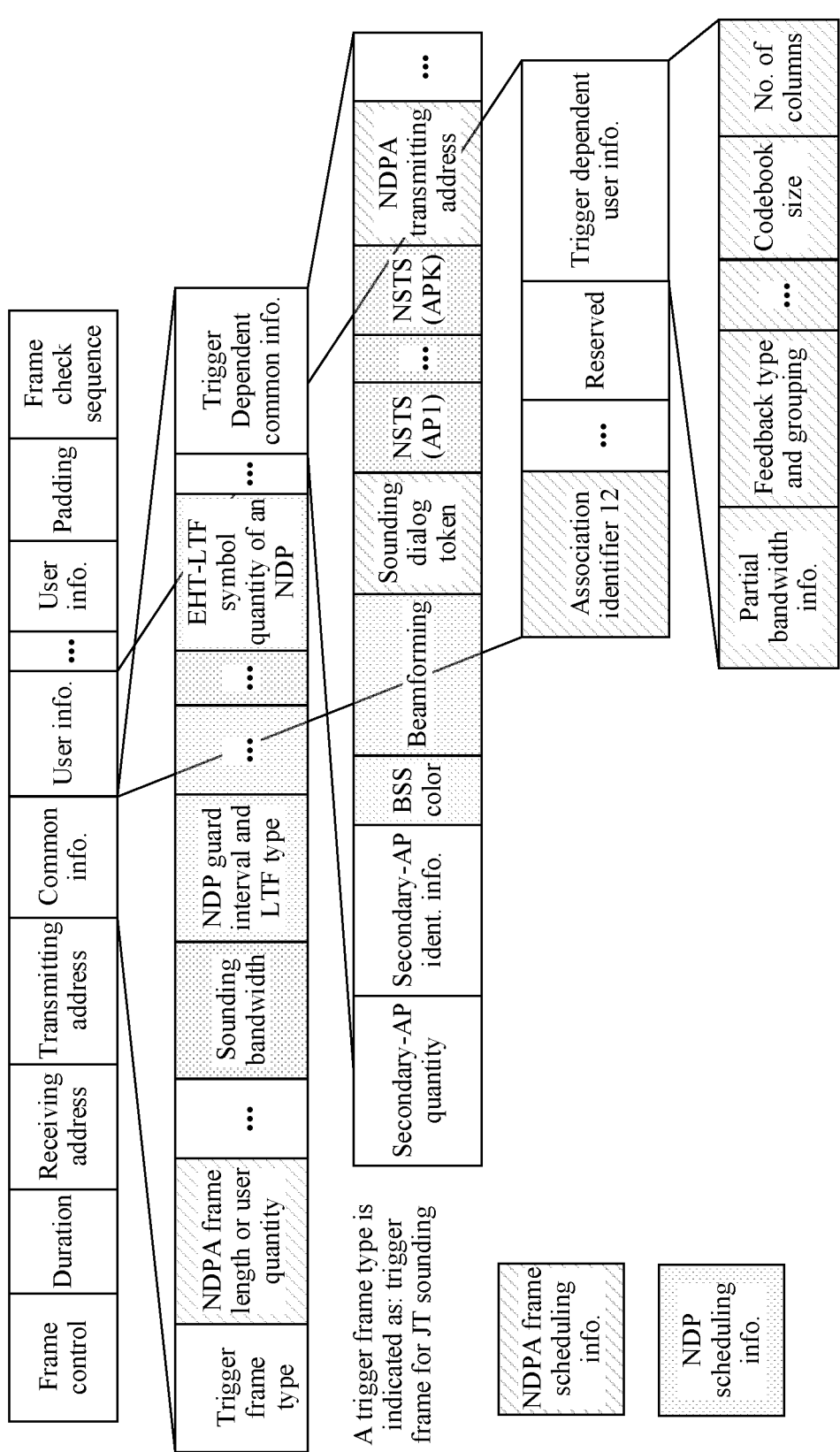
FIG. 12A is a diagram of a frame structure of a trigger frame according to an embodiment of this application.
Figure 12B:
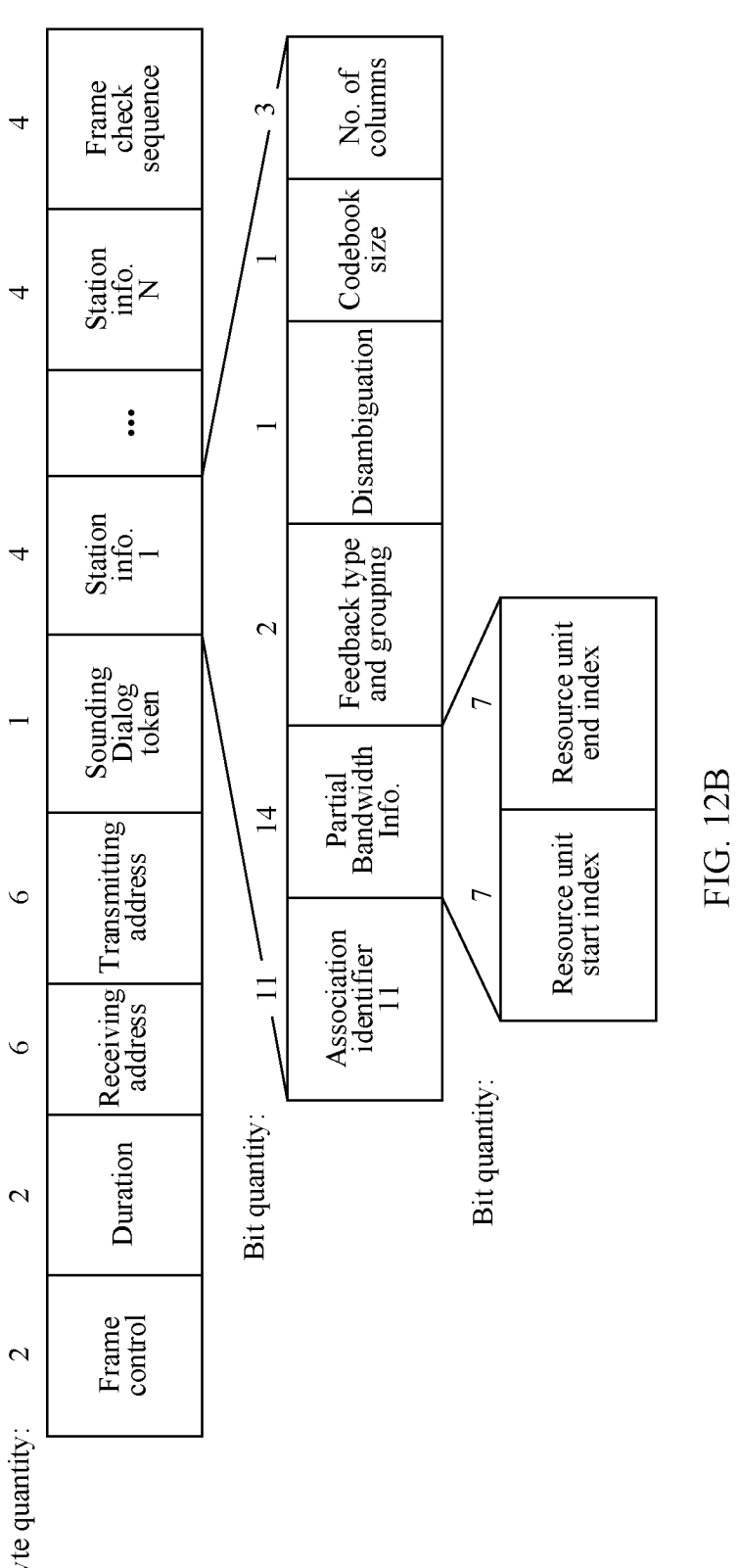
FIG. 12B is a diagram of a frame structure of a NDPA frame according to an embodiment of this application.

As an example, FIG. 12A is a diagram of a frame structure of a trigger frame according to an embodiment of this application. As shown in FIG. 12B, information indicated by a station information 1 field may be determined based on information indicated by a user information field shown in FIG. 12A. For example, a value of a partial bandwidth information subfield in the station information 1 field may be equal to a value of a partial bandwidth information subfield in FIG. 12A. For another example, a quantity of columns and a codebook size may also correspond to values in FIG. 12A. For another example, information indicated by a duration field may also be determined based on a duration field shown in FIG. 12A. Optionally, a receiving address in FIG. 12B may be set to a broadcast address. A value of a disambiguation subfield is fixed to 1.

Figure 12C:
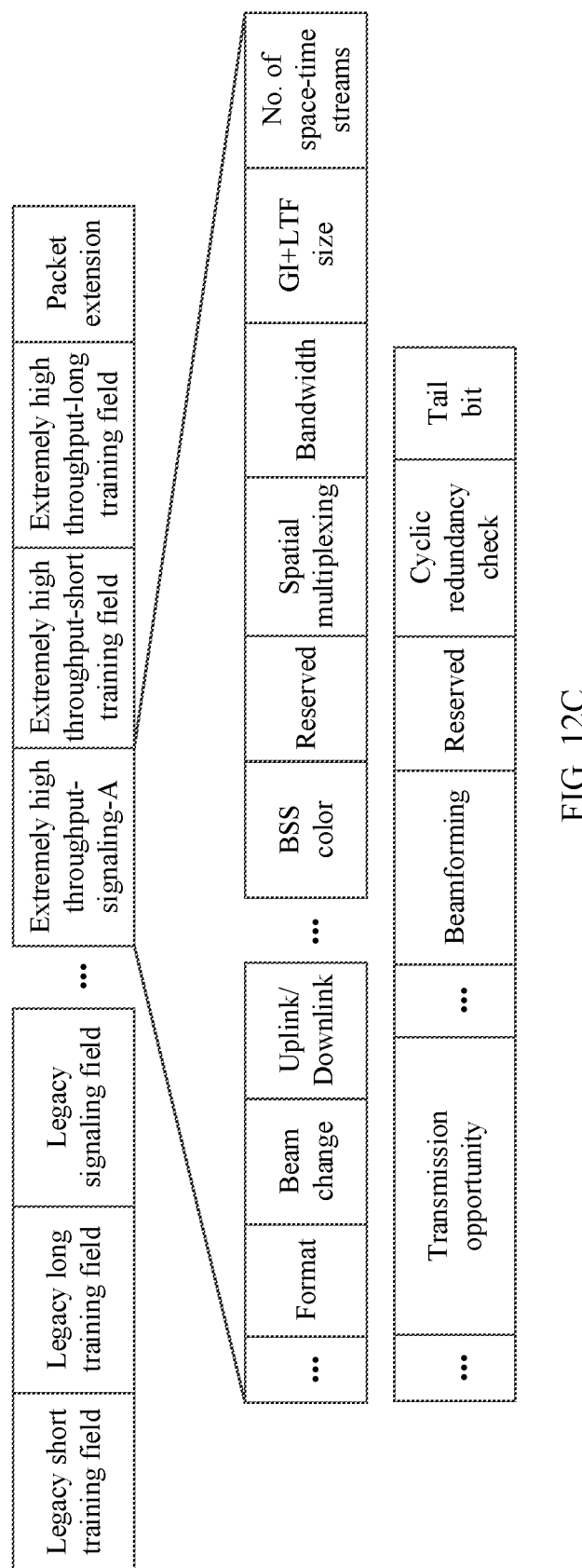
FIG. 12C is a diagram of a structure of a NDP according to an embodiment of this application.

As shown in FIG. 12C, a NDP does not include a data field. Signaling information included in extremely high throughput-signaling-A (EHT-SIG-A) may be set based on information indicated by the trigger frame. For example, a value of a bandwidth subfield may be equal to a value of a sounding bandwidth subfield in FIG. 12A. A value of a number of space-time streams subfield may be determined based on a value of an NSTS subfield of the AP2 in FIG. 12A. For example, if the AP2 needs to send an NDP based on a trigger frame, a value of a number of space-time streams subfield of the NDP shown in FIG. 12C may be the value of the NSTS subfield of the AP2 in FIG. 12A. A transmission opportunity is calculated based on duration indicated by the trigger frame. Reserved subfields in FIG. 12C may be set to a same value, for example, 0 or 1, or a value of a reserved subfield in FIG. 12C is equal to a value of a reserved subfield in FIG. 12A.

In this embodiment of this application, the AP1 sends the trigger frame to the AP2 and the AP3, so that the AP2 and the AP3 simultaneously perform channel sounding, for example, the AP2 and the AP3 simultaneously send the NDPA frame and the NDP, and do not interfere with each other. This improves channel sounding efficiency. In addition, the AP2 and the AP3 perform channel sounding according to a parameter indicated by the trigger frame sent by the AP1, so that the AP2 and the AP3 perform channel sounding based on a parameter required for coordinated transmission. This improves efficiency of coordinated transmission.

FIG. 13A is a signal diagram of a channel sounding method according to an embodiment of this application.

(1301) An AP1 sends a trigger frame, where the trigger frame is used to trigger an AP2 to perform channel sounding.

It may be understood that the trigger frame may also be referred to as an NDPA frame, a secondary AP trigger frame, a sounding request frame, a sounding scheduling frame, or the like. This is not limited in this embodiment of this application.

Optionally, the trigger frame may also be used to trigger the AP1 to perform channel sounding. Whether the AP1 and the AP2 simultaneously perform channel sounding is not limited in this embodiment of this application.

It may be understood that, for a frame structure of the trigger frame, refer to the frame structure shown in FIG. 12A. Details are not described herein again.

(1302) The AP2 sends a trigger frame for triggering an NDP (trigger for NDP) to a STA1 and a STA2 based on the information indicated by the trigger frame, where the trigger frame for triggering the NDP is used to trigger the STA1 and the STA2 to send the NDP.

Figure 13B:
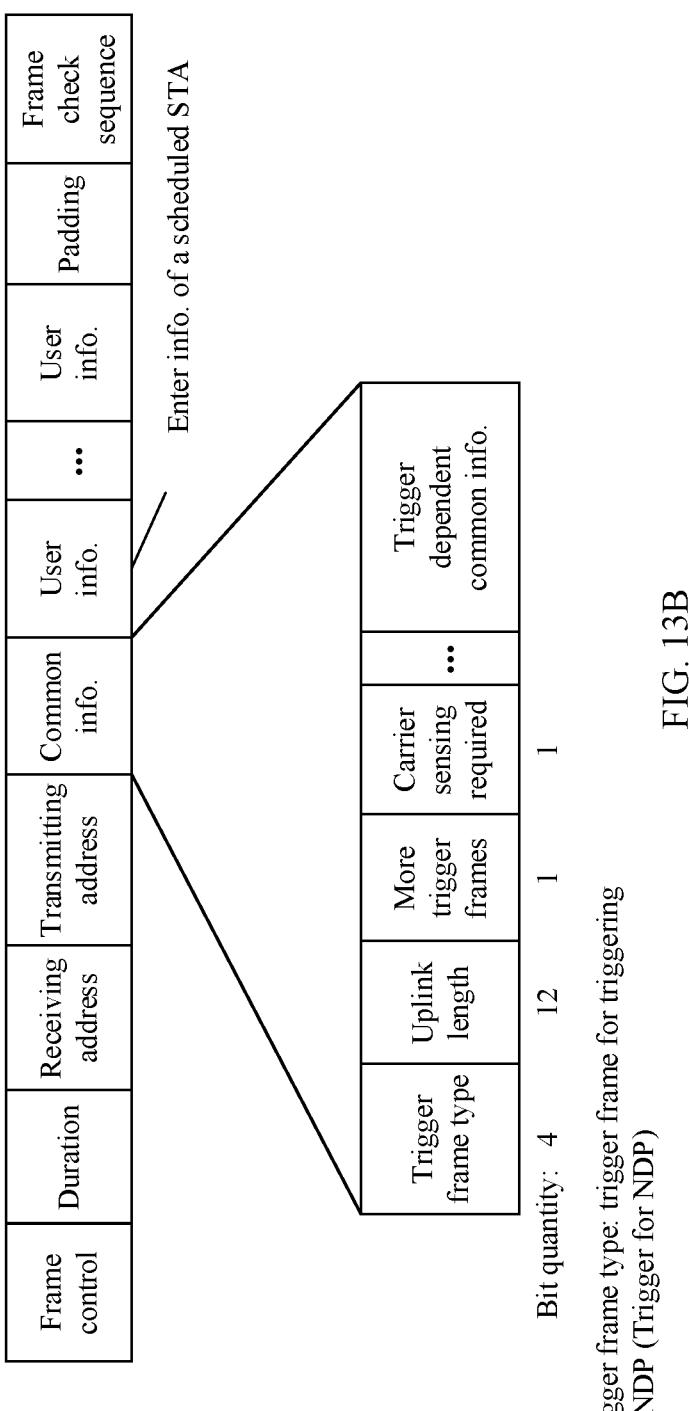
FIG. 13B is a signal diagram of a frame structure of a trigger frame for triggering an NDP according to an embodiment of this application.

As an example, FIG. 13B is a diagram of a frame structure of a trigger frame for triggering an NDP according to an embodiment of this application. For detailed descriptions of the frame structure, refer to the foregoing embodiment. Details are not described herein again.

(1303) The STA1 sends an NDP to the AP2, and the STA2 sends an NDP to the AP2.

(1304) The AP2 estimates CSI between the AP2 and the STA1 and CSI between the AP2 and the STA2 based on the parameter indicated by the trigger frame.

For example, the AP2 may estimate the CSI between the AP2 and the STA1 based on a codebook size, a quantity of grouping, a quantity of columns, and the like that are included in the trigger frame.

This embodiment of this application describes in detail a process in which a first access point device triggers a second access point device to perform channel sounding, so that the second access point device can generate a corresponding trigger frame for triggering an NDP (Trigger for NDP) based on the indicated information, to perform multi-AP channel sounding.

It may be understood that in the frame structures shown in this embodiment of this application, field locations or subfield locations of the frame structures are not limited.

It may be understood that the trigger frame provided in this embodiment of this application may further include a trigger type field, and the trigger type field may be used to indicate a purpose of the trigger frame. For example, the trigger frame is used to trigger a STA to send a BFR frame, or is used to trigger an AP to perform channel sounding, and the like. Details are not described herein again.

It may be understood that the foregoing embodiments have respective focuses. For an implementation that is not described in detail in one of embodiments, refer to other embodiments. Details are not described herein again. Further, embodiments described in this specification may be independent solutions, or may be combined according to internal logic. All these solutions fall within the protection scope of this application.

The foregoing describes in detail the methods provided in embodiments of this application, and the following describes in detail apparatuses provided in embodiments of this application.

Figure 14:
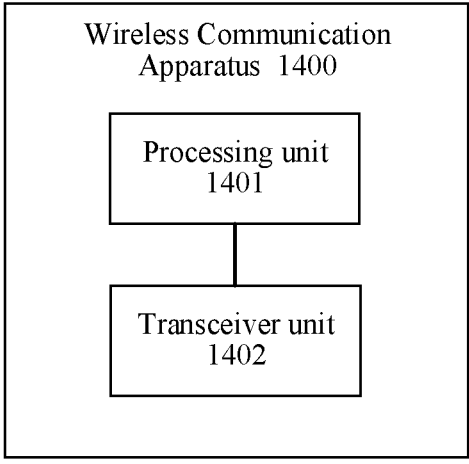
FIG. 14 is a diagram of a wireless communication apparatus according to an embodiment of this application.

FIG. 14 is a diagram of a wireless communication apparatus according to an embodiment of this application. The wireless communication apparatus may be configured to perform the channel sounding methods provided in this application. As shown in FIG. 14, in an embodiment, the wireless communication apparatus includes:

a processing unit 1401, configured to determine a sounding request frame; and a transceiver unit 1402, configured to output the sounding request frame, where the sounding request frame is for requesting a second access point device to perform channel sounding, the sounding request frame includes a sounding bandwidth field and/or a number of spatial streams field, the sounding bandwidth field is used to indicate a bandwidth for performing channel sounding, and the number of spatial streams field is used to indicate a quantity of spatial streams on which channel sounding is performed.

Optionally, the transceiver unit 1402 may be configured to send the sounding request frame to the second access point device.

In an embodiment, the sounding request frame further includes an access point identifier field, and the access point identifier field is used to indicate identification information of the second access point device.

In an embodiment, the sounding request frame further includes a station information field, and the station information field is used to indicate identification information of a station device. The identification information of the station device includes an association identifier of the station device; or the identification information of the station device includes an association identifier of the station device and identification information of an access point device associated with the station device.

In an embodiment, the transceiver unit 1402 is further configured to output a null data packet announcement NDPA frame.

The transceiver unit 1402 is further configured to output a null data packet NDP.

The transceiver unit 1402 is configured to receive a beamforming report frame sent by the station device. The beamforming report frame is used to report channel state information between the wireless communication apparatus and the station device.

Optionally, the transceiver unit 1402 may be further configured to send a null data packet announcement NDPA frame to the station device.

Optionally, the transceiver unit 1402 may be further configured to send a null data packet NDP to the station device.

In an embodiment, the transceiver unit 1402 is further configured to output a trigger frame. The trigger frame is used to trigger the second access point device to feed back a sounding response frame.

The transceiver unit 1402 is further configured to receive the sounding response frame sent by the second access point device.

Optionally, the transceiver unit 1402 may be further configured to send the trigger frame to the second access point device.

In an embodiment, the transceiver unit 1402 is configured to output an aggregate medium access control MAC protocol data unit MPDU frame. The aggregate frame includes the sounding request frame and a trigger frame, and the trigger frame is used to trigger the second access point device to feed back the sounding response frame.

The transceiver unit 1402 is further configured to receive the sounding response frame sent by the second access point device.

Optionally, the transceiver unit 1402 is configured to send an aggregate medium access control MAC protocol data unit MPDU frame to the second access point device.

In an embodiment, the sounding request frame further includes scheduling information used by the second access point device to transmit the sounding response frame. The transceiver unit 1402 is configured to receive the sounding response frame sent by the second access point device.

In an embodiment, the transceiver unit 1402 is further configured to output a query frame. The query frame includes a sounding dialog token, and the query frame is used to inquire whether a sounding request frame corresponding to the sounding dialog token is received.

In another embodiment, the wireless communication apparatus includes:

a transceiver unit 1402, configured to receive a sounding request frame sent by a first access point device, where the sounding request frame is for requesting the apparatus to perform channel sounding, the sounding request frame includes a sounding bandwidth field and/or a number of spatial streams field, the sounding bandwidth field is used to indicate a bandwidth for performing channel sounding, and the number of spatial streams field is used to indicate a quantity of spatial streams on which channel sounding is performed; and a processing unit 1402, configured to parse the sounding request frame.

The transceiver unit 1402 is configured to perform channel sounding based on the sounding request frame, to obtain channel state information between the apparatus and a station device.

In an embodiment, the transceiver unit 1402 is configured to: send a null data packet NDP to the station device, where a bandwidth field of the NDP is determined based on a sounding bandwidth field in the sounding request frame, and a number of spatial streams field of the NDP is determined based on the number of spatial streams field in the sounding request frame; and receive a beamforming report frame sent by the station device, where the beamforming report frame is used to report channel state information between the second access point device and the station device.

In an embodiment, the sounding request frame further includes an access point identifier field, and the access point identifier field is used to indicate identification information of the apparatus.

In an embodiment, the sounding request frame further includes a station information field, and the station information field is used to indicate identification information of the station device.

The identification information of the station device includes an association identifier of the station device; or the identification information of the station device includes an association identifier of the station device and identification information of an access point device associated with the station device.

In an embodiment, the transceiver unit 1402 is further configured to: receive a trigger frame sent by the first access point device, where the trigger frame is used to trigger the apparatus to feed back a sounding response frame; and send the sounding response frame to the first access point device.

Alternatively, the transceiver unit 1402 is configured to receive an aggregate medium access control MAC protocol data unit MPDU frame sent by the first access point device, where the aggregate frame includes the sounding request frame and the trigger frame, and the trigger frame is used to trigger the apparatus to feed back the sounding response frame; and the transceiver unit 1402 is further configured to send the sounding response frame to the first access point device.

Alternatively, the sounding request frame further includes scheduling information used by the apparatus to transmit the sounding response frame; and the transceiver unit 1402 is further configured to send the sounding response frame to the first access point device based on the scheduling information.

In the foregoing various embodiments:

In an embodiment, the processing unit 1401 may be implemented by using one or more processors, and the transceiver unit 1402 may be implemented by using a transceiver.

In an embodiment, the processing unit 1401 may be implemented by using one or more processing circuits, and the transceiver unit 1402 may be implemented by using an interface circuit (or an input/output interface, a communication interface, an interface, or the like).

It may be understood that, for implementation of the units shown in FIG. 14, refer to corresponding descriptions of the method embodiments shown in FIG. 4 to FIG. 13B.

Figure 15:
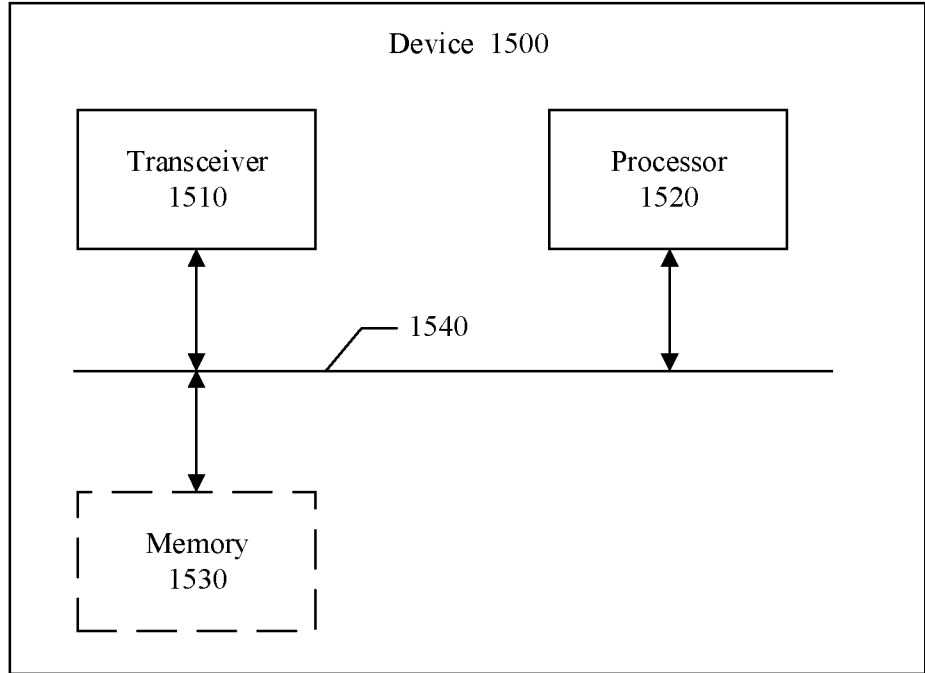
FIG. 15 is a diagram of an access point device according to an embodiment of this application.

For example, when the processing unit in the foregoing apparatus is implemented by using a processor, and the transceiver unit is implemented by using a transceiver, as shown in FIG. 15, a device 150 includes at least one processor 1520, configured to implement a function of the first access point device or the second access point device in the method provided in embodiments of this application. The device 150 may further include a transceiver 1510. The transceiver may be configured to communicate with another device via a transmission medium. The processor 1520 sends and receives data (for example, sends and receives a sounding request frame, a trigger frame, or the like) by using the transceiver 1510, and is configured to implement the methods in the foregoing method embodiments.

Optionally, the device 150 may further include at least one memory 1530, configured to store program instructions and/or data. The memory 1530 is coupled to the processor 1520. The coupling in this embodiment of this application may be an indirect coupling or a communication connection between apparatuses, units, or modules in an electrical form, a mechanical form, or another form; and is used for information exchange between the apparatuses, the units, or the modules. The processor 1520 may operate in collaboration with the memory 1530. The processor 1520 may execute the program instructions stored in the memory 1530.

A connection medium between the transceiver 1510, the processor 1520, and the memory 1530 is not limited in this embodiment of this application. In this embodiment of this application, the memory 1530, the processor 1520, and the transceiver 1510 are connected through a bus 1540 in FIG. 15. The bus is represented by using a bold line in FIG. 15. A manner of a connection between other components is merely an example for description, and is not limited thereto. The bus may be classified into an address bus, a data bus, a control bus, and the like. For ease of representation, only one bold line is used for representation in FIG. 15, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component; and may implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module.

The memory in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memories in the system and method described in this specification include but are not limited to these memories and any memory of another suitable type.

According to the method provided in embodiments of this application, this application further provides a computer program. The computer program is used to perform the channel sounding method in embodiments shown in this application.

According to the method provided in embodiments of this application, this application further provides a computer program product. The computer program product includes computer program code. When the computer program code is executed on an access point device, the access point device is enabled to perform the channel sounding method in embodiments shown in this application.

According to the method provided in embodiments of this application, this application further provides a computer-readable storage medium. The computer-readable storage medium stores program code. When the program code is executed on an access point device, the access point device is enabled to perform the channel sounding method in embodiments shown in this application.

According to the method provided in embodiments of this application, this application further provides a communication system, including the foregoing first access point device and the foregoing second access point device. For the first access point device and the second access point device, refer to the foregoing embodiments. Details are not described herein again.

In the foregoing embodiments, all or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in the figures, both a computing device and an application that runs on the computing device may be components. One or more components may reside within a process and/or an execution thread, and a component may be located on one computer and/or distributed between two or more computers. In addition, these components may be executed on various computer-readable media that store various data structures. The components may communicate with each other by using a local and/or remote process and based on, for example, a signal having one or more data packets (for example, data from two components interacting with another component in a local system, a distributed system, and/or across a network such as the internet interacting with another system by using a signal).

A person of ordinary skill in the art may be aware that, various illustrative logical blocks (illustrative logical block) and steps that are described with reference to embodiments disclosed in this specification may be implemented by electronic hardware or a combination of computer software and electronic hardware. Whether specific functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, reference may be made to a corresponding process in the foregoing method embodiments, and details are not described herein again.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication apparatus, comprising:
a processing unit configured to determine a sounding request frame; and
a transceiver unit configured to:
send the sounding request frame to a second access point device, the sounding request frame requesting the second access point device perform channel sounding, the sounding request frame comprising one or both of a sounding bandwidth field or a number of spatial streams field, the sounding bandwidth field indicating a bandwidth for performing the channel sounding and the number of spatial streams field indicating a quantity of spatial streams on which the channel sounding is performed; and send a query frame comprising a sounding dialog token, the query frame inquiring whether a sounding request frame corresponding to the sounding dialog token has been received.

2. The apparatus according to claim 1, wherein the sounding request frame further comprises an access point identifier field, the access point identifier field indicating identification information of the second access point device.

3. The apparatus according to claim 1, wherein:

the sounding request frame further comprises a station information field, the station information field indicating identification information of a station device;

the station device identification information comprises a station device association identifier of the station device, or the station device identification information comprises the station device association identifier and an access point device identification information of an access point device associated with the station device.

4. The apparatus according to claim 3, wherein:

the transceiver unit is further configured to send a null data packet announcement (NDPA) frame to the station device;

the transceiver unit is further configured to send a null data packet (NDP) to the station device; and the transceiver unit is further configured to receive a beamforming report frame sent by the station device, the beamforming report frame reporting channel state information between the apparatus and the station device.

5. The apparatus according to claim 4, wherein:

the transceiver unit is further configured to send a trigger frame to the second access point device, the trigger frame triggering the second access point device to feed back a sounding response frame; and the transceiver unit is further configured to receive the sounding response frame sent by the second access point device;

or the transceiver unit is configured to send an aggregate medium access control (MAC) protocol data unit (MPDU) frame to the second access point device, the aggregate MPDU frame comprising the sounding request frame and a trigger frame, the trigger frame triggering the second access point device to feed back the sounding response frame; and the transceiver unit is further configured to receive the sounding response frame sent by the second access point device;

or the sounding request frame further comprises scheduling information used by the second access point device to transmit the sounding response frame; and the transceiver unit is further configured to receive the sounding response frame sent by the second access point device.

6. A wireless communication apparatus, comprising:

a transceiver unit configured to receive a sounding request frame sent by a first access point device, the sounding request frame requesting the apparatus perform channel sounding, the sounding request frame comprising one or both of a sounding bandwidth field or a number of spatial streams field, the sounding bandwidth field indicating a bandwidth for performing the channel sounding and the number of spatial streams field indicating a quantity of spatial streams on which the channel sounding is to be performed; and a processing unit configured to parse the sounding request frame;

the transceiver unit being configured to:

perform the channel sounding based on the sounding request frame to obtain channel state information between the apparatus and a station device;

send a null data packet (NDP) to the station device, wherein a NDP bandwidth field of the NDP is determined based on the sounding bandwidth field in the sounding request frame, and a number of NDP spatial streams field of the NDP is determined based on the number of spatial streams field in the sounding request frame; and receive a beamforming report frame sent by the station device, the beamforming report frame reporting the channel state information between the second access point device and the station device.

7. The apparatus according to claim 6, wherein the sounding request frame further comprises an access point identifier field, the access point identifier field indicating identification information of the apparatus.

8. The apparatus according to claim 7, wherein the sounding request frame further comprises a station information field, the station information field indicating station device identification information of the station device, wherein:

the station device identification information comprising a station device association identifier of the station device, or the station device identification information comprising the station device association identifier and an access point device identification information of an access point device associated with the station device.

9. The apparatus according to claim 8, wherein:

the transceiver unit is further configured to: receive a trigger frame sent by the first access point device, the trigger frame triggering the apparatus to feed back a sounding response frame; and send the sounding response frame to the first access point device;

or the transceiver unit is configured to receive an aggregate medium access control (MAC) protocol data unit (MPDU) frame sent by the first access point device, the aggregate MPDU frame comprising the sounding request frame and the trigger frame, the trigger frame triggering the apparatus to feed back the sounding response frame; and the transceiver unit is further configured to send the sounding response frame to the first access point device;

or the sounding request frame further comprises scheduling information used by the apparatus to transmit the sounding response frame; and the transceiver unit is further configured to send the sounding response frame to the first access point device based on the scheduling information.

10. A channel sounding method, wherein the method comprises:

sending, by a first access point device, a sounding request frame to a second access point device, the sounding request frame requesting the second access point device perform channel sounding, the sounding request frame comprising one or both of a sounding bandwidth field or a number of spatial streams field, the sounding bandwidth field indicating a bandwidth for performing the channel sounding, and the number of spatial streams field indicating a quantity of spatial streams on which the channel sounding is to be performed; and sending, by the first access point device, a query frame comprising a sounding dialog token, the query frame inquiring whether a sounding request frame corresponding to the sounding dialog token has been received.

11. The method according to claim 10, wherein the sounding request frame further comprises an access point identifier field, the access point identifier field indicating identification information of the second access point device.

12. The method according to claim 11, wherein the sounding request frame further comprises a station information field, the station information field indicating a station device identification information of a station device, wherein:

the station device identification information comprises a station device association identifier of the station device, or the station device identification information comprises the station device association identifier and an access point device identification information of an access point device associated with the station device.

13. The method according to claim 12, wherein before the first access point device sends the sounding request frame to the second access point device, the method further comprises:

sending, by the first access point device, a null data packet announcement (NDPA) frame to the station device;

sending, by the first access point device, a null data packet (NDP) to the station device; and receiving, by the first access point device, a beamforming report frame sent by the station device, the beamforming report frame reporting channel state information between the first access point device and the station device.

14. The method according to claim 13, wherein the method further comprises:

sending, by the first access point device, a trigger frame to the second access point device, the trigger frame triggering the second access point device to feed back a sounding response frame; and receiving, by the first access point device, the sounding response frame sent by the second access point device.

15. The method according to claim 13, wherein:

the sending, by the first access point device, the sounding request frame to a second access point device comprises:

sending, by the first access point device, an aggregate medium access control (MAC) protocol data unit (MPDU) frame to the second access point device, the aggregate MPDU frame comprises the sounding request frame and a trigger frame, the trigger frame triggering the second access point device to feed back the sounding response frame; and receiving, by the first access point device, the sounding response frame sent by the second access point device.

16. The method according to claim 13, wherein:

the sounding request frame further comprises scheduling information used by the second access point device to transmit the sounding response frame; and the first access point device receives the sounding response frame sent by the second access point device.

\* \* \* \* \*